United States Patent
Ikeda et al.

(10) Patent No.: US 7,067,074 B2
(45) Date of Patent: *Jun. 27, 2006

(54) NEAR-INFRARED-ABSORBING COMPOSITION AND OPTICAL MATERIAL

(75) Inventors: Tsukasa Ikeda, Iwaki (JP); Hiroki Katono, Iwaki (JP); Masuhiro Syouji, Iwaki (JP); Katsuichi Machida, Iwaki (JP)

(73) Assignee: Kureha Corporation, Tokyo (JP)

( * ) Notice: Subject to any disclaimer, the term of this patent is extended or adjusted under 35 U.S.C. 154(b) by 316 days.

This patent is subject to a terminal disclaimer.

(21) Appl. No.: 10/257,293

(22) PCT Filed: Mar. 16, 2001

(86) PCT No.: PCT/JP01/02106

§ 371 (c)(1), (2), (4) Date: Oct. 9, 2002

(87) PCT Pub. No.: WO01/77250

PCT Pub. Date: Oct. 18, 2001

(65) Prior Publication Data

US 2003/0160217 A1    Aug. 28, 2003

(30) Foreign Application Priority Data

Apr. 10, 2000 (JP) .............................. 2000-108281
Jan. 18, 2001 (JP) ................................ 2001-10552

(51) Int. Cl.
G02B 5/22 (2006.01)
F21V 9/00 (2006.01)
C07F 9/06 (2006.01)

(52) U.S. Cl. ..................... 252/582; 252/587; 359/885; 556/13

(58) Field of Classification Search ............... 252/582
See application file for complete search history.

(56) References Cited

U.S. PATENT DOCUMENTS 4,783,386 A * 11/1988 Nikles et al. ................. 430/19
5,611,965 A * 3/1997 Shouji et al. ................ 252/582
6,261,737 B1 * 7/2001 Fujita et al. .............. 430/270.1
6,542,292 B1 * 4/2003 Onomichi et al. ........... 359/350
2004/0204600 A1 * 10/2004 Hayashi et al. ............... 556/24

FOREIGN PATENT DOCUMENTS

| EP | 0277741 | 1/1988 |
|---|---|---|
| GB | 2179254 | 8/1985 |
| GB | 2203336 | 2/1988 |
| GB | 2241889 | 2/1991 |
| JP | 6-118228 | 4/1994 |
| JP | 06207088 A * | 7/1994 |
| JP | 10-221523 | 8/1998 |
| JP | 10-282335 | 10/1998 |
| JP | WO98/55885 | 12/1998 |
| JP | WO0177250 A1 * | 3/2001 |
| JP | 2002212540 A * | 7/2002 |
| WO | WO98/25168 | 6/1998 |

* cited by examiner

Primary Examiner—Randy Gulakowski
Assistant Examiner—Timothy J. Kugel
(74) Attorney, Agent, or Firm—Beyer Weaver & Thomas LLP

(57) ABSTRACT

A near infrared absorptive composition of the present invention contains phosphate compounds represented by Formula (8)-c and Formula (8)-d below;

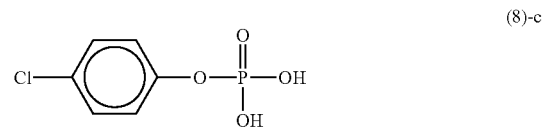

(8)-c

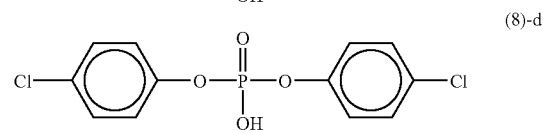

(8)-d and copper ions. An optical material of the present invention is a material wherein the near infrared absorptive composition is mixed in a resin.

7 Claims, 7 Drawing Sheets

NEAR-INFRARED-ABSORBING COMPOSITION AND OPTICAL MATERIAL

TECHNICAL FIELD

The present invention relates to a near infrared absorptive composition and an optical material.

BACKGROUND ART

The conventional near infrared absorptive optical materials making use of the absorbing property of light of specific wavelengths by copper ions include, for example, the material making up the optical filter described in Japanese Patent Application Laid-Open No. 06-118228 filed by Applicant, and others. This optical material contains a phosphate compound and copper ions and has the near infrared absorbing property.

DISCLOSURE OF THE INVENTION

Incidentally, the foregoing optical filter with the near infrared absorbing property also has an excellent visible light transmitting property. In recent years, such optical filters are expected to achieve further improvement in the visible light transmitting property while maintaining the excellent near infrared absorbing property. Specifically, there are needs for further expansion of the transmission wavelength region (range) of visible light and/or for further increase in the transmittance of visible light, for example.

Therefore, the present invention has been accomplished under such circumstances and an object of the invention is to provide a near infrared absorptive composition and an optical material having the excellent near infrared absorbing property and the visible light transmitting property better than before.

In order to achieve the above object, the inventors have conducted elaborate research and found out that a near infrared absorptive composition obtained by using a phosphate compound of a specific molecular structure together with copper ions demonstrated an extremely excellent visible light transmitting property, thus completing the present invention.

Namely, an optical material according to the present invention comprises a phosphate compound represented by Formula (1) below;

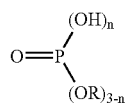

and copper ions.

In this case, R in Formula (1) indicates an aryl group at least one hydrogen atom of which is replaced by a halogen atom or a group having an aromatic ring, n is 1 or 2, and, in the case of n being 1, R's may be identical to or different aryl groups. Alternatively, R in Formula (1) may be a substituted or unsubstituted naphthyl group or a substituted or unsubstituted anthryl group.

It was verified from measurement of absorption spectra of such near infrared absorptive compositions that the near infrared absorptive compositions of the present invention demonstrated the following characteristics, as compared with the conventional compositions;

1) the wavelength at the maximum absorbance in the near infrared wavelength region (which will be referred to hereinafter as "λmax") was shifted to the longer wavelength side, and 2) the absorbance at the long wavelength part of the visible light transmission wavelength region (e.g., at the wavelength of 650 nm) to the absorbance at this λmax was lowered.

A content of hydroxyl groups in the phosphate compound or oxygen atoms derived from the hydroxyl groups relative to 1 mole of the copper ions is preferably 2 or more moles, more preferably 3 or more moles, and still more preferably 6 or more moles. Such a near infrared absorptive composition demonstrates a more noticeable shift of λmax to the longer wavelength side and higher visible light transmission to the near infrared absorption than the conventional compositions having a like component composition.

More preferably, the phosphate compound is a compound in which R in Formula (1) is a group represented by Formula (2) or Formula (3) below;

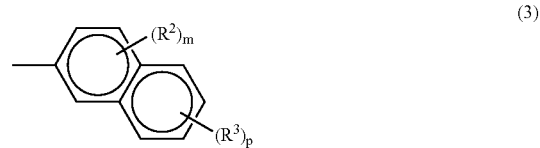

In this case, each of $R^1$, $R^2$, and $R^3$ in Formula (2) and Formula (3) indicates a halogen atom or a group having an aromatic ring, k is an integer of 1–5, m an integer of 1–3, and p an integer of 1–4. $R^1$, $R^2$, and $R^3$ may be identical to or different from each other, and, in the case of k, m, or p being 2 or more, substituents of each kind may be identical to or different from each other.

Further, more preferably the group having the aromatic ring in the aryl group of Formula (1), or the group having the aromatic ring in each of $R^1$, $R^2$, and $R^3$ is a phenyl group (at least one hydrogen atom of which may be replaced by a halogen atom, a C1–C10 alkyl group, or a C2–C20 group having at least one unsaturated bond, or which may be an unsubstituted group).

Another near infrared absorptive composition according to the present invention comprises a phosphate compound in which R in Formula (1) is an aryl group at least one hydrogen atom of which is replaced by a substituted or unsubstituted methacryloyl oxyalkyl group, preferably a group represented by Formula (2)-a below and copper ions.

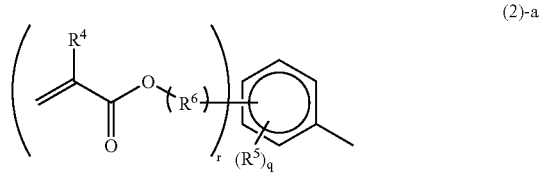

In this case, $R^4$ in Formula (2)-a indicates a hydrogen atom or a methyl group, $R^5$ a hydrogen atom, a C1–C10 alkyl group, a halogen atom, an alkoxy group, or a phenyl group, $R^6$ a C1–C10 linear, branched, or cyclic alkylene group, q an integer of 0–4, r an integer of 1–5, and q+r an integer of 1–5. The above-stated near infrared absorptive composition also demonstrates excellent spectral characteristics peculiar to the present invention.

An optical material according to the present invention is a material wherein the near infrared absorptive composition of the present invention is mixed in a resin, i.e., a material wherein the aforementioned phosphate compound and copper ions are mixed in a resin. In this case, the near infrared absorptive composition is provided with characteristics and properties according to the resin. This makes it feasible to obtain optical materials suitable for various applications, by properly selecting the resin.

BEST MODE FOR CARRYING OUT THE INVENTION

Figure 1:
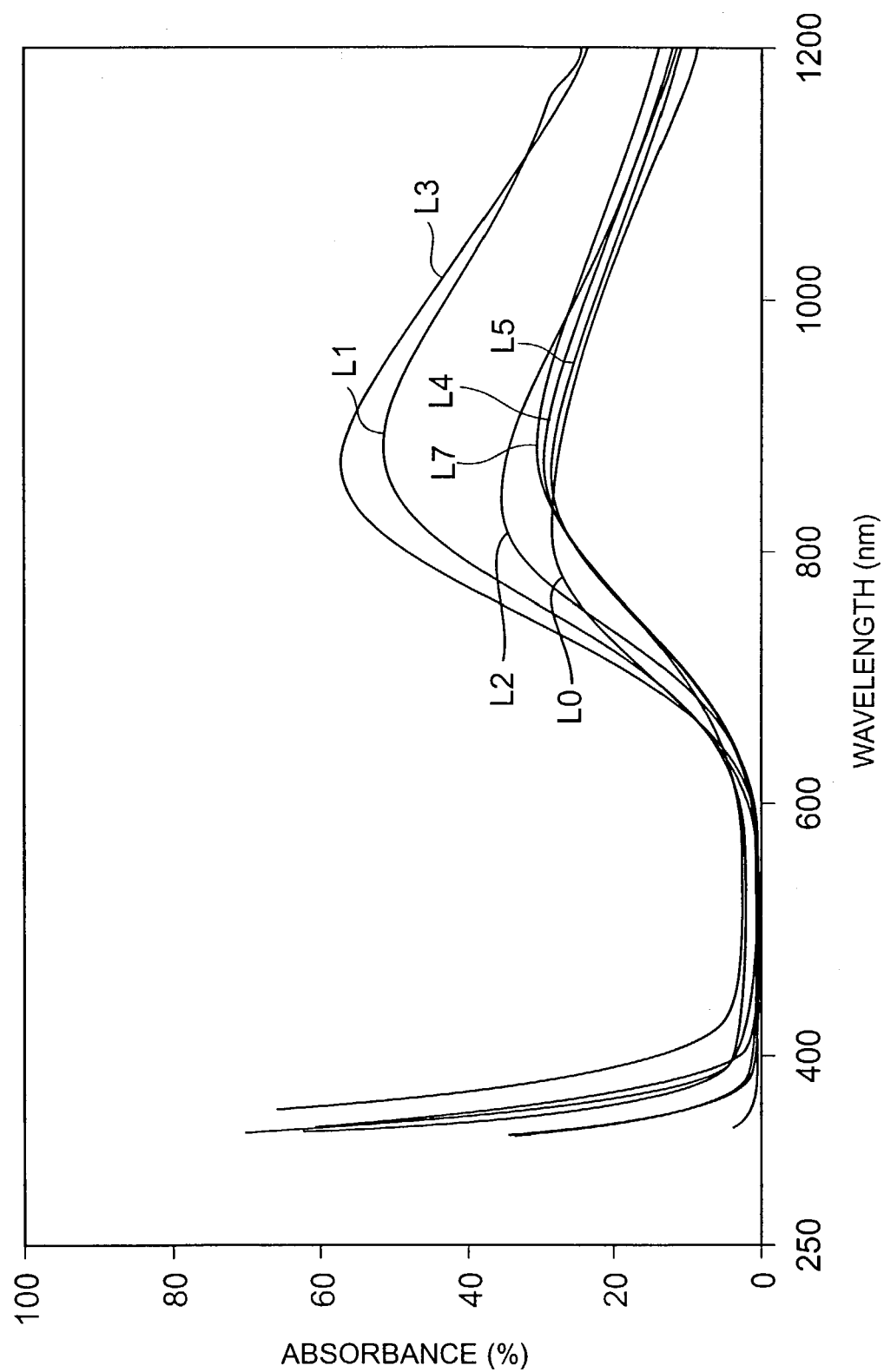
FIG. 1 is a graph showing absorption spectra of respective near infrared absorptive compositions in Examples and Comparative Example where OH/Cu is 6.

The following will describe the preferred embodiments of the near infrared absorptive composition and optical material according to the present invention.

<Copper Ions>

The near infrared absorptive composition of the present invention contains copper ions and the phosphate compound represented by Formula (1). Specific examples of copper salts for supplying the copper ions include anhydrides, hydrates, and hydrated compounds of organic acid-copper salts, such as copper acetate, copper acetate monohydrate, copper formate, copper stearate, copper benzoate, copper ethylacetoacetate, copper pyrophosphate, copper naphthenate, and copper citrate; anhydrides, hydrates, and hydrated compounds of inorganic acid-copper salts, such as copper chloride, copper sulfate, copper nitrate, and basic copper carbonate; and copper hydroxide. Among them, copper acetate, copper acetate monohydrate, copper benzoate, copper hydroxide, and basic copper carbonate are preferably used.

Further, the near infrared absorptive composition of the present invention may contain other metal ions than the copper ions (hereinafter referred to as "other metal ions"). There are no specific restrictions on the other metal ions, but they can be ions of alkali metals, alkaline earth metals, or transition metals. More specifically, they can be ions of sodium, potassium, calcium, iron, manganese, magnesium, nickel, and so on.

When the near infrared absorptive composition contains such other metal ions, the preferred percentages of the copper ions and other metal ions are determined, for example, so that the copper ions are preferably not less than 50% by mass and more preferably not less than 70% by mass of all the metal ions. As prepared in this way, the near infrared absorptive composition of the present invention can fully exhibit the optical characteristics specific to the copper ions, i.e., the near infrared absorbing property.

<Phosphate Compound>

The phosphate compound making up the near infrared absorptive composition of the present invention is one represented by Formula (1) below, wherein R in the Formula indicates an aryl group at least one hydrogen atom of which is replaced by a halogen atom or a group having an aromatic ring (specifically, a phenyl group, a naphthyl group, an anthryl group, or the like), n is 1 or 2, and, in the case of n being 1, R's may be identical or different groups. Alternatively, R may be a substituted naphthyl group or a substituted anthryl group with a group except for a halogen atom and a group having an aromatic ring; or an unsubstituted naphthyl group or an unsubstituted anthryl group.

Among the phosphate compounds represented by Formula (1) (which will be referred to hereinafter as "specific phosphate compound"), those applicable more preferably are phosphate compounds wherein R in Formula (1) is represented by Formula (2) or Formula (3) below.

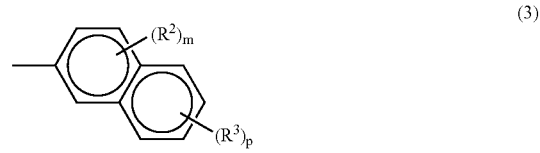

Here each of $R^1$, $R^2$, and $R^3$ in the formulas indicates a halogen atom or a group having an aromatic ring, k indicates an integer of 1–5, m an integer of 1–3, p an integer of 1–4, $R^1$, $R^2$, and $R^3$ may be identical to or different from each other, and, in the case of k, m, or p being 2 or more, substituents of each kind may be identical to or different from each other.

Preferably, each of $R^1$, $R^2$, and $R^3$ is a phenyl group at least one hydrogen atom of which is replaced by a halogen atom, a C1–C10 alkyl group, or a C2–C20 group having at least one unsaturated bond (e.g., a (meth)acryloyl group, a (meth)acryloyl oxyalkyl group, or the like).

Further, the group R in Formula (1) may be an aryl group having a (meth)acryloyl oxyalkyl group, and specific examples of this group R include those represented by Formula (2)-a below;

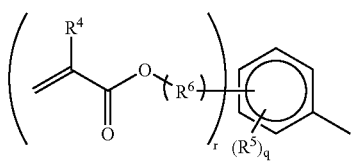

In Formula (2)-a herein, $R^4$ indicates a hydrogen atom or a methyl group, $R^5$ a hydrogen atom, a C1–C10 alkyl group, a halogen atom, an alkoxy group, or a phenyl group, $R^6$ a C1–C10 linear, branched, or cyclic alkylene group, q an integer of 0–4, r an integer of 1–5, and q+r an integer of 1–5.

These phosphate compounds are produced, for example, by one of the first method, the second method, the third method, etc. as described below.

(First Method)

The first method is a method of bringing about reaction between a compound represented by Formula (4) below and phosphorus pentoxide without a solvent or in an appropriate organic solvent. R in Formula (4) indicates the same group as R in above Formula (1).

The compound represented by Formula (4) represents substituted or unsubstituted aromatic compounds having a phenolic hydroxyl group, which will be referred to hereinafter herein as "specific aryl alcohol." Among these, it is preferable to employ phenol where R is a phenyl group, or one of compounds represented by Formula (5) or Formula (6) below;

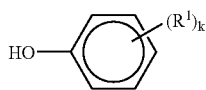

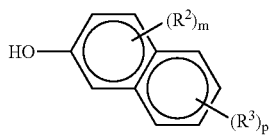

Here $R^1$, $R^2$, and $R^3$ in the formulas are the same groups as $R^1$, $R^2$, and $R^3$ in above Formula (2) and Formula (3). The preferable phosphate compounds represented by Formula (2) or Formula (3) can be made using the phosphate compounds represented by Formula (5) or Formula (6).

Specific examples of preferred aryl alcohol with $R^1$ being a halogen atom among those represented by the formula (5) include 2-fluorophenol, 4-fluorophenol, 3-chlorophenol, 4-chlorophenol, and so on. Specific examples of preferred aryl alcohol with $R^1$ being a group having at least one unsaturated bond include 2-(meth)acryloylphenol, 3-(meth)acryloylphenol, 4-(meth)acryloylphenol, 2-allylphenol, 3-allylphenol, 4-allylphenol, and so on. It is also preferable to use a substituted phenol represented by Formula (5)-a below;

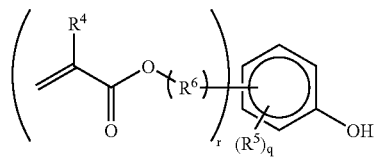

e.g., 4-(meth)acryloyloxyethylphenol or the like.

Further, specific examples of preferred aryl alcohol with $R^1$ being a substituted or unsubstituted phenyl group include 2-phenylphenol, 3-phenylphenol, 4-phenylphenol, and so on. Furthermore, Specific examples of the compounds represented by Formula (6) include α-naphthol, β-naphthol, and so on.

The part "meth" in parentheses above means a notation used for simple description when there arises the need for describing both acrylic acid or its derivatives and methacrylic acid or its derivatives, and is also adopted in the present specification (this will also apply to the following).

The organic solvent used for the reaction of the specific aryl alcohol with the phosphorus pentoxide can be one of organic solvents that do not react with the phosphorus pentoxide; for example, such organic solvents include hydrocarbon solvents such as hexane, cyclohexane, heptane, octane, benzene, toluene, xylene, and petroleum spirit; hydrocarbon halide solvents such as chloroform, carbon tetrachloride, dichloroethane, and chlorobenzene; ether solvents such as diethyl ether, diisopropyl ether, dibutyl ether, and tetrahydrofuran; and ketone solvents such as acetone, methyl ethyl ketone, and dibutyl ketone, among which toluene and xylene are preferably applicable.

In the first method, the reaction conditions for the reaction between specific aryl alcohol and phosphorus pentoxide are that the reaction temperature is 0–100° C., preferably 40–80° C., and the reaction time is 1–96 hours, preferably 4–72 hours. For example, when the specific aryl alcohol and phosphorus pentoxide are used at the molar ratio of 3:1, the reaction product is a mixture at an approximate ratio of 1:1 of a phosphoric monoester compound (hereinafter referred to as "monoester"), wherein the number of hydroxyl groups in Formula (1) is 2 (n in Formula (1) is 2), and a phosphoric diester compound (hereinafter referred to as "diester"), wherein the number of hydroxyl groups in Formula (1) is 1 (n in Formula (1) is 1).

Further, by properly selecting the ratio of the specific aryl alcohol and phosphorus pentoxide and the reaction conditions, the ratio of the monoester and diester can be adjusted within the range of the molar ratio from 99:1 to 40:60.

(Second Method)

The second method is a method of bringing about reaction between specific aryl alcohol and phosphorus oxyhalide without a solvent or in an appropriate organic solvent and adding water into the reaction product to effect hydrolysis thereof. The phosphorus oxyhalide can be preferably one of phosphorus oxychloride and phosphorus oxybromide, and is particularly preferably phosphorus oxychloride.

The organic solvent used for the reaction of the specific aryl alcohol with the phosphorus oxyhalide is one of organic solvents that do not react with the phosphorus oxyhalide; for example, such organic solvents include hydrocarbon solvents such as hexane, cyclohexane, heptane, octane, benzene, toluene, xylene, and petroleum spirit; hydrocarbon halide solvents such as chloroform, carbon tetrachloride, dichloroethane, and chlorobenzene; and ether solvents such as diethyl ether, diisopropyl ether, and dibutyl ether, among which toluene and xylene are preferably applicable.

The reaction conditions for the reaction between specific aryl alcohol and phosphorus oxyhalide are that the reaction temperature is 0–110° C., preferably 40–80° C., and the reaction time is 1–20 hours, preferably 2–8 hours. In the second method, a monoester can be obtained, for example, using the specific aryl alcohol and phosphorus oxyhalide at the molar ratio of 1:1. Further, by selecting the ratio of the specific aryl alcohol and phosphorus oxyhalide and the reaction conditions, a mixture of a monoester and a diester can be obtained and in this case, the ratio thereof can be adjusted in the range of the molar ratio from 99:1 to 1:99.

(Third Method)

The third method is a method of bringing about reaction between specific aryl alcohol and phosphorus trihalide without a solvent or in an appropriate organic solvent to synthesize a phosphonate compound, and thereafter oxidizing the resultant phosphonate compound. The phosphorus trihalide can be one of phosphorus trichloride and phosphorus tribromide, and is particularly preferably phosphorus trichloride.

The organic solvent used for the reaction of the specific aryl alcohol with the phosphorus trihalide is one of organic solvents that do not react with the phosphorus trihalide; for example, such organic solvents include hydrocarbon solvents such as hexane, cyclohexane, heptane, octane, benzene, toluene, xylene, and petroleum spirit; hydrocarbon halide solvents such as chloroform, carbon tetrachloride, dichloroethane, and chlorobenzene; and ether solvents such as diethyl ether, diisopropyl ether, and dibutyl ether, among which hexane and heptane are preferably applicable. Further, the reaction conditions for the reaction between the specific aryl alcohol and the phosphorus trihalide are that the reaction temperature is 0–90° C., preferably 40–75° C., and the reaction time is 1–10 hours, preferably 2–5 hours.

Further, as a means for oxidizing the foregoing phosphonate compound, it is possible to utilize a means for reacting the phosphonate compound, for example, with a halogen such as chlorine gas or the like to synthesize a phosphorohaloridate compound, and hydrolyzing the phosphorohaloridate compound. Here the reaction temperature for the reaction between the phosphonate compound and halogen is preferably 0–40° C., particularly preferably 5–25° C. Before the oxidation of the phosphonate compound, the phosphonate compound may be distilled for purification.

In the third method, a diester of high purity can be obtained, for example, by using the specific aryl alcohol and phosphorus trihalide at the molar ratio of 3:1. By selecting the ratio of the specific aryl alcohol and phosphorus trihalide and the reaction conditions, a mixture of a monoester and a diester can be obtained and in this case, the ratio thereof can be adjusted in the range of the molar ratio from 99:1 to 1:99.

Specific examples of preferable phosphate compounds obtained by the first to third methods above include compounds represented by Formula (7)-a, Formula (7)-b, Formulas (8)-a to h, Formulas (9)-a to 1, and Formulas (10)-a to f below. These phosphate compounds can be used singly or in combination of two or more, or in a mixed state with a phosphate compound without an aromatic ring which can be used in the conventional near infrared absorptive compositions.

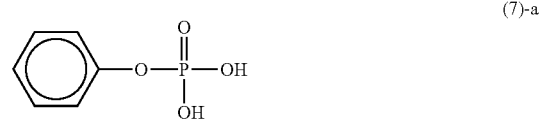 (7)-a

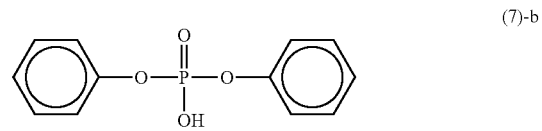 (7)-b

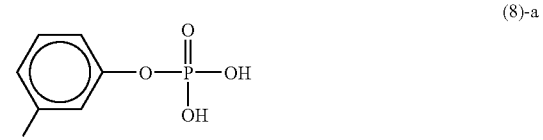 (8)-a

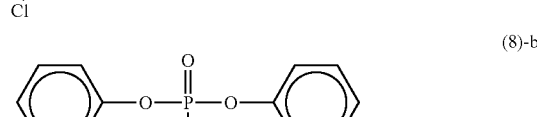 (8)-b

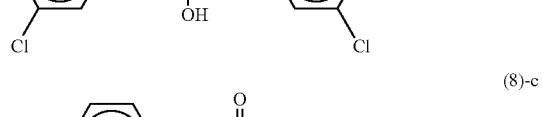 (8)-c

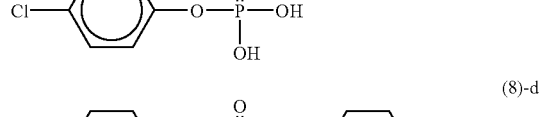 (8)-d

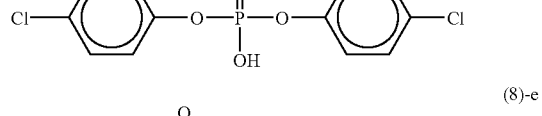 (8)-e

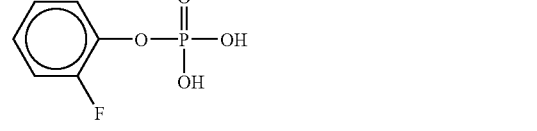 (8)-f

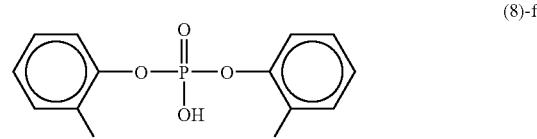 (8)-g

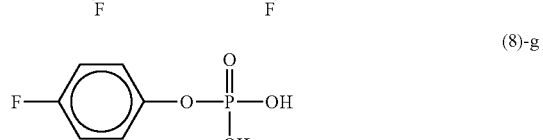 (8)-h

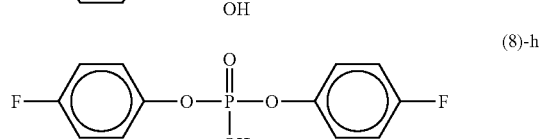 (9)-a

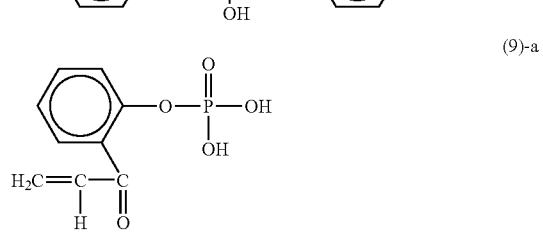

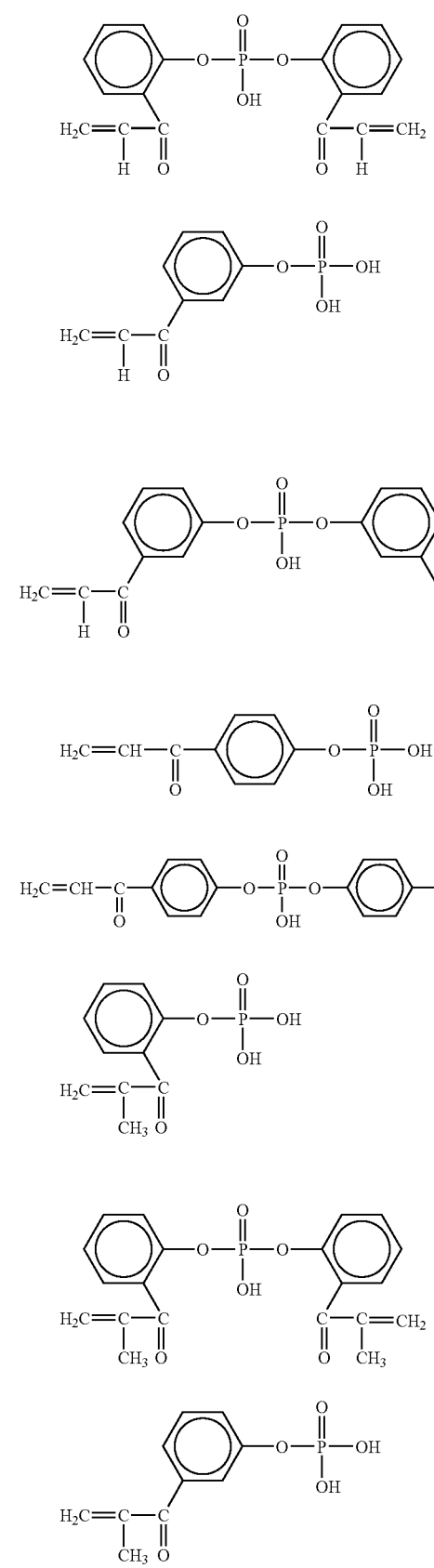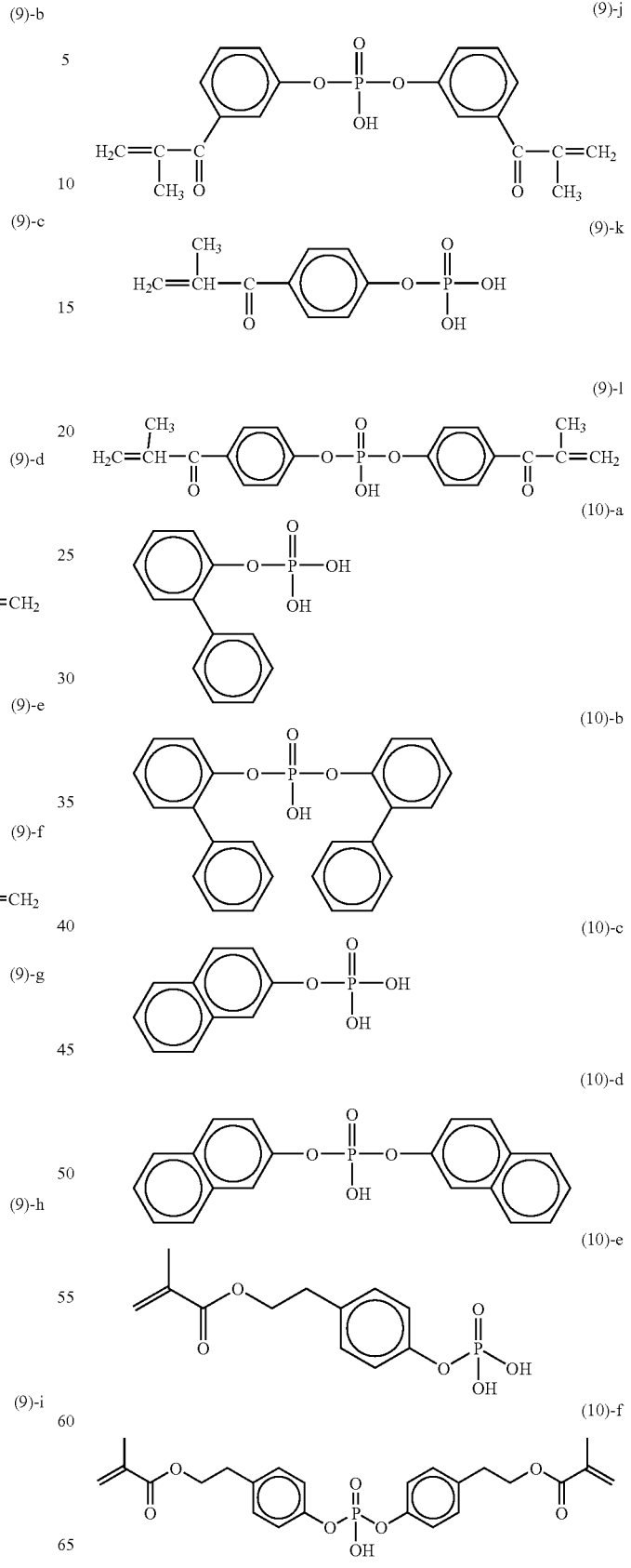

As described above, monoesters or diesters can be used as the specific phosphate compounds, but triesters without any hydroxyl group in Formula (1) are not suitable, because they have no hydroxyl group capable of forming a coordinate bond and/or an ionic bond with the metal ions such as the copper ions or the like and it is thus difficult to disperse the metal ions such as the copper ions or the like in the resin, e.g., in order to form a resin composition.

Here each of $R^1$, $R^2$, and $R^3$ in Formula (2) and Formula (3) is preferably a halogen atom or a C1–C40 substituent (which may or may not include an unsaturated bond), as described above. If the number of carbons in this substituent exceeds 40, when the phosphate compound is blended in the resin described hereinafter, the compatibility with the resin can be considerably degraded, which tends to make it difficult to disperse the metal ions such as the copper ions or the like in the resin.

In the case where $R^1$, $R^2$, and $R^3$ in Formula (2) and Formula (3) are substituted or unsubstituted alkyl groups, the number of carbons therein is preferably 1–10. If a phosphate compound having eleven or more carbons is mixed in the resin described below, it can result in degradation of compatibility with the resin, which tends to make it difficult to disperse the metal ions such as the copper ions or the like in the resin.

Further, where $R^1$, $R^2$, and $R^3$ are groups having at least one unsaturated bond, the number of carbons therein is preferably 2–20. When the number of carbons exceeds 20 in this case, the compatibility can be degraded between the phosphate compound and the resin, which tends to make it difficult to disperse the metal ions such as the copper ions or the like in the resin. Further, the same as above can also apply to the case where $R^1$, $R^2$, and $R^3$ are substituted phenyl groups and where the substituent thereof is an alkyl group or a group having at least one unsaturated double bond.

Further, in the near infrared absorptive composition according to the present invention, the content of hydroxyl groups in the phosphate compound (hydrogen groups in Formula (1)) or oxygen atoms derived from the hydroxyl groups relative to 1 mole of copper ions is preferably not less than 2 moles, more preferably not less than 3 moles, and still more preferably not less than 6 moles. Further, where the phosphate compound is one with $R^1$ in Formula (2) being a halogen atom, the content ratio is more preferably 2–9, particularly preferably 2–6.

In the near infrared absorptive composition of the present invention as described above, phosphoric groups of the phosphate compound represented by Formula (1) are bonded to the copper ions by a coordinate bond and/or an ionic bond, and the copper ions are dissolved or dispersed in the near infrared absorptive composition in a state in which they are surrounded by phosphate molecules. In this configuration, the near infrared light is selectively absorbed by electronic transition between the d orbitals of the copper ions, so as to reveal an excellent near infrared absorbing property.

By using the phosphate compound represented by Formula (1), it becomes feasible to shift the wavelength at the maximum absorbance in the near infrared wavelength region ($\lambda$max) to the longer wavelength side, as compared with the conventional compositions. This moves the absorbed light wavelength region altogether to the longer wavelength side and in conjunction therewith, the visible light transmission wavelength region is expanded toward the longer wavelength side. In other words, it can be mentioned that the "visible window" becomes wider. Accordingly, the resultant visible light transmitting property extends across the wider wavelength region, as compared with the conventional compositions. Further, by using the specific phosphate compounds represented by Formula (1), it is feasible to lower the absorbance at the long wavelength part of the visible light transmission wavelength region, e.g., near the wavelength of 650 nm relative to the absorbance at $\lambda$max. Accordingly, it becomes feasible to considerably enhance the transparency to the visible light at the long wavelength part relative to the near infrared absorbability.

Incidentally, the mechanism of action to present this effect is not clarified yet detail, but it can be estimated, for example, as follows. Namely, the phosphate compound represented by Formula (1) has the dimensions of molecules greater than those of the conventional phosphate compounds without an aromatic ring. This increases intramolecular or intermolecular steric hindrance, so as to lengthen the bond distance to the copper ions conceivably. As a consequence, influence (interaction) of other atoms or ions on the valence electron state of the copper ions is relieved, to change the level structure of electron energy levels of copper ions into one different from that before, and thus improve the absorbing and transmitting characteristics, which is considered to be a cause. It is, however, noted that the mechanism of action is not limited to the above.

By using as the phosphate compound one of those in which R in Formula (1) is represented by Formula (2), it is feasible to lower the absorbance at the short wavelength part in the visible light transmission wavelength region, e.g., near the wavelength of 450 nm. By using as the phosphate compound one of those in which R in Formula (1) is represented by Formula (3), on the other hand, it is feasible to lower the absorbance at the long wavelength part in the visible light transmission wavelength region. These permit the visible light transmitting property of the near infrared absorptive composition to be further enhanced.

Further, in the near infrared absorptive composition according to the present invention, where the ratio of hydroxyl groups in the phosphate compound or oxygen atoms derived from the hydroxyl groups to 1 mole of copper ions is not less than 2 moles, preferably not less than 3 moles, more preferably not less than 6 moles, the aforementioned shift of $\lambda$max to the longer wavelength side becomes noticeable. Therefore, the visible light transmitting property can be further enhanced. Particularly, where the phosphate compound is one of those wherein $R^1$ in Formula (2) is a halogen atom, the absorbance at the short wavelength part in the visible light transmission wavelength region can be further lowered when the content ratio is more preferably 2–9, particularly preferably 2–6.

On the other hand, by using as the phosphate compound one of those wherein R in Formula (1) is one represented by Formula (3), preferably a substituted or unsubstituted naphthyl group, the absorbance can be more remarkably lowered at the long wavelength part in the visible light transmission wavelength region.

Further, when the phosphate compound is one with R wherein $R^1$, $R^2$, and $R^3$ in Formula (2) or Formula (3) are groups including at least one unsaturated bond, the near infrared absorptive composition can be mixed in a resin copolymerizable with the phosphate compound and they can be polymerized. In this case, the phosphate compound can be, so to speak, in a state in which it is chemically dispersed in the resin. This can improve the dispersibility in cases where the phosphate compound is hardly dissolved or dispersed well in the resin and, in turn, the dispersibility of copper ions.

<Optical Material>

The optical material according to the present invention is one containing the near infrared absorptive composition of the present invention and can be substantiated, for example, in one of the following forms.

(First Embodiment): the near infrared absorptive composition itself (Second Embodiment): a liquid composition containing the near infrared absorptive composition (Third Embodiment): a resin composition containing the near infrared absorptive composition (Fourth Embodiment): an adhesive composition containing the near infrared absorptive composition The optical materials of these forms can also be considered to be near infrared absorptive compositions in terms of the compositions. The following will describe each of these forms.

FIRST EMBODIMENT

The Near Infrared Absorptive Composition Itself

The near infrared absorptive composition is produced by contact and reaction under appropriate conditions between the specific phosphate compound and one of the aforementioned copper salts as a copper ion source. Specifically, it can be made by one of the fourth method, the fifth method, etc. as described below. It is also possible to use a metal salt as another metal ion source as mixed with them. In the following, the metal salts including the copper salt will be referred to simply as "metal salt."

(Fourth Method): a method of mixing the specific phosphate compound and the metal salt together and bringing about reaction between them.

(Fifth Method): a method of reacting the specific phosphate compound with the metal salt in an appropriate organic solvent.

There are no specific restrictions on the organic solvent used in the fifth method as long as the specific phosphate compound used can be dissolved or dispersed therein. For examples, it can be one of aromatic compounds such as benzene, toluene, and xylene; alcohols such as methyl alcohol, ethyl alcohol, and isopropyl alcohol; glycol ethers such as methyl cellosolve and ethyl cellosolve; ethers such as diethyl ether, diisopropyl ether, and dibutyl ether; ketones such as acetone and methyl ethyl ketone; esters such as ethyl acetate and the like; hexane; kerosene; and petroleum ether; and so on. In addition, it is also possible to use one of polymerizable organic solvents, for example, (meth)acrylic acid esters such as (meth)acrylates and the like; aromatic vinyl compounds such as styrene and α-methyl styrene; and so on.

SECOND EMBODIMENT

Liquid Composition

This liquid composition is a composition in which the near infrared absorptive composition obtained by the reaction between the specific phosphate compound and the metal salt is mixed in a solvent. The liquid composition is preferably one from which a thin film or a thin layer can be formed by evaporation of the solvent so as to be transparent to light of wavelengths except for the wavelengths to be absorbed by the copper ions or the like, and the liquid composition itself may be transparent, semitransparent, or opaque.

The solvent can be water or an organic solvent. The organic solvent may be one of alcohols such as methyl alcohol, ethyl alcohol, isopropyl alcohol, and butyl alcohol; glycol ethers such as methyl cellosolve and ethyl cellosolve; ethers such as diethyl ether and diisopropyl ether; ketones such as acetone, methyl ethyl ketone, methyl isobutyl ketone, and cyclohexanone; esters such as ethyl acetate, isopropyl acetate, butyl acetate, and butylcellosolve acetate; aromatic compounds such as benzene, toluene, and xylene; hexane; kerosene; petroleum ether; and so on. Further, examples of other applicable solvents are organic solvents including (meth)acrylic acid esters such as (meth)acrylates and the like; and aromatic vinyl compounds such as styrene and α-methyl styrene; and so on.

The liquid composition is preferably produced by the aforementioned (fourth method) or (fifth method), where the solvent is an organic solvent. The liquid composition can also be prepared by dissolving or dispersing the near infrared absorptive composition preliminarily produced, in the solvent. The content of the near infrared absorptive composition included in this liquid composition differs depending upon the type of the solvent used and upon application and intended use of the optical material, but, in terms of viscosity after preparation, it is normally adjusted in the range of 0.1 to 1900 parts by weight, preferably in the range of 1 to 900 parts by weight, and particularly preferably in the range of 5 to 400 parts by weight, based on 100 parts by weight of the solvent.

THIRD EMBODIMENT

Resin Composition

This resin composition is a composition in which the near infrared absorptive composition is mixed in a resin. There are no specific restrictions on the resin as long as it is one with excellent compatibility or dispersibility with the specific phosphate compound and/or a metallic phosphate compound. It can be preferably one selected from resins such as acrylic resins described below, for example.

The acrylic resins preferably applicable include (meth) acrylate monomers or polymers obtained therefrom. Specific examples of monofunctional monomers among the (meth) acrylate monomers include alkyl (meth)acrylates such as methyl (meth)acrylate, ethyl (meth)acrylate, n-propyl (meth)acrylate, n-butyl (meth)acrylate, isobutyl (meth)acrylate, tertiary-butyl (meth)acrylate, n-hexyl (meth)acrylate, and n-octyl (meth)acrylate; modified (meth)acrylates such as glycidyl (meth)acrylate, 2-hydroxyethyl (meth)acrylate, 2-hydroxypropyl (meth) acrylate, hydroxybutyl (meth)acrylate, isobornyl (meth)acrylate, methoxypolyethylene (meth) acrylate, and phenoxy (meth)acrylate; and examples of polyfunctional monomers among the (meth)acrylate monomers include ethylene glycol di(meth)acrylate, diethylene glycol di(meth) acrylate, polyethylene glycol di(meth) acrylate, polypropylene glycol di(meth)acrylate, 1,3-butylene glycol di(meth)acrylate, 1,4-butanediol di(meth)acrylate, 1,6-hexanediol di(meth)acrylate, neopentyl glycol di(meth) acrylate, 2-hydroxy-1,3-di(meth)acrylate, 2,2-bis[4-(meth) acryloxyethoxyphenyl]propane, 2-hydroxy-1-(meth)acryloxy-3-(meth)acryloxypropane, trimethylolpropane tri (meth)acrylate, pentaerythritol tri(meth)acrylate, pentaerythritol tetra(meth)acrylate, and so on.

Other applicable resins may be resins consisting of one of the above (meth)acrylate monomers and another copolymerizable monomer that can be copolymerized with the (meth) acrylate monomer. Specific examples of such copolymerizable monomers include unsaturated carboxylic acids such as (meth)acrylic acid, 2-(meth)acryloyloxyethyl succinic acid, and 2-(meth)acryloyloxyethyl phthalic acid; acrylamides such as N,N-dimethylacrylamide and the like; aromatic vinyl compounds such as styrene, α-methylstyrene, chlorostyrene, dibromostyrene, methoxystyrene, vinylbenzoic acid, and hydroxymethylstyrene; and so on.

Further, examples of other polymers highly compatible with the specific phosphate compounds include polyethylene telephthalate (PET), polyethylene, polypropylene, poly (vinyl chloride), polycarbonate, etc.; and polymers of aromatic vinyl compounds such as styrene, α-methylstyrene, chlorostyrene, dibromostyrene, methoxystyrene, vinylbenzoic acid, hydroxymethylstyrene, and divinylbenzene.

When only monofunctional monomers are used as the monomers making up the resin, a thermoplastic product is obtained as a polymerized, molded product. When polyfunctional monomers are used as part or as the whole of the monomers, the resultant product is a thermosetting molded product. By properly selecting one from these resins, it thus becomes feasible to obtain a molded product of an optical material according to an intended use, an application, a processing/molding method, and so on. Among these, use of the thermoplastic compounds facilitates reforming after polymerization and thus enhances formability.

There are no particular restrictions on specific methods for preparing the resin composition, but it is preferable to prepare it by one of the sixth method, the sixth method, etc. as described below.

(Sixth Method)

The seventh method is a method of mixing the specific phosphate compound and metal salt, or the near infrared absorptive composition obtained by the reaction between them, in a monomer to prepare a monomer composition. This monomer composition can be used as an optical material as it is, without being polymerized; or, this monomer composition may be further polymerized by radical polymerization to obtain a polymer composition.

When the phosphate compound with R wherein $R^1$, $R^2$, and $R^3$ in Formula (2) or Formula (3) are groups including at least one unsaturated bond, is used as the specific phosphate compound, as described previously, it is feasible to disperse the phosphate compound and the metal ions such as the copper ions or the like well in the resin on the basis of copolymerization between the phosphate compound and the monomer.

There are no particular restrictions on specific methods of the radical polymerization of the monomer composition, and it is possible to employ ordinary radical polymerization methods using a radical polymerization initiator, e.g., the well-known methods such as bulk (cast) polymerization, suspension polymerization, emulsion polymerization, solution polymerization, and so on.

From the viewpoint of enhancing weather resistance and heat resistance of the molded product of the optical material obtained by polymerization of the monomer composition, it is preferable to add one or more of various additives for polymer such as an ultraviolet absorber, a light stabilizer, and so on into the monomer composition. It is also possible to add one or more of various colorants in order to control the color tone of the optical material.

Examples of the ultraviolet absorber include ultraviolet absorbers based on salicylates such as p-tert-butylphenyl salicylate and the like; benzophenones such as 2,4-dihydroxybenzophenone, 2-hydroxy-4-methoxybenzophenone, and the like; benzotriazoles such as 2-(2'-hydroxy-3'-tert-butyl-5'-methylphenyl)-5-chrolobenzotriazole, 2-(2'-hydroxy-5'-octylphenyl)benzotriazole, and the like; cyanoacrylates such as ethyl-2-cyano-3,3-diphenylacrylate and the like; and so on.

Examples of the light stabilizer include various hindered amine based light stabilizers such as bis(1,2,2,6,6-pentamethyl-4-piperidyl)sebacate, bis(2,2,6,6-tetramethyl-4-piperidyl)sebacate, di(1,2,2,6,6-pentamethyl-4-piperidyl)-butyl (3',5'-ditert-butyl-4-hydroxybenzyl)malonate, 1-(2-(3-(3,5-ditert-butyl-4-hydroxyphenyl)propionyloxy)ethyl)-4-(3-(3,5-ditert-butyl-4-hydroxyphenyl)propionyloxy)-2,2,6,6-tetramethylpiperidine, poly{(6-{1,1,3,3-tetramethylbutyl)amino}-1,3,5-triazin-2,4-diyl)(1,6-{2,2,6,6-tetrametyl-4-piperidinyl}aminohexamethylene)}, poly{{6-(morpholino)-S-triazin-2,4-diyl}{1,6-(2,2,6,6-tetramethyl-4-piperidyl)amino}hexamethylene}, a polymer of dimethyl succinate with 4-hydroxy-2,2,6,6-tetramethyl-1-piperidinethanol, and so on.

Further, the radical polymerization initiator can be one of ordinary organic peroxide based polymerization initiators. Examples of preferably applicable initiators include peroxyesters such as tert-butylperoxyneodecanoate, tert-butylperoxydecanate, tert-butylperoxypivalate, tert-butylperoxybenzoate, tert-butylperoxy-2-ethylhexanoate, tert-butylperoxylaurate, and tert-butylperoxy-3,5,5-trimethylhexanoate; diacylperoxides such as lauroylperoxide and 3,5,5-trimethylhexanoylperoxide; peroxyketals such as 1,1-bis(ter-butylperoxy)-3,5,5-trimethylcyclohexane and the like; and so on.

Other applicable initiators include azo based radical polymerization initiators such as 2,2-azobis(isobutyronitrile), 2,2'-azobis(2,4-demethylvaleronitrile), and 1,1'-azobis(cyclohexane-2-carbonitrile).

(Seventh Method)

The seventh method is a method of adding the specific phosphate compound and metal salt, or the near infrared absorptive composition obtained by the reaction between them, into the resin and mixing them. This method can be employed when a thermoplastic resin is used as the resin. Specifically, there are (1) a method of adding the specific phosphate compound and metal salt, or the near infrared absorptive composition into the molten resin and kneading them; and (2) a method of dissolving, dispersing, or swelling the resin in an appropriate organic solvent, adding the specific phosphate compound and the metal salt, or the near infrared absorptive composition into this solution, mixing them, and thereafter removing the organic solvent from the solution.

The kneading means in the above method (1) can be any means commonly used as melt kneading methods of thermoplastic resin, e.g., means of melt kneading with mixing rolls, means of pre-mixing them with a Henschel mixer or the like and thereafter melt-kneading them with an extruder. On the other hand, there are no particular restrictions on the organic solvent used in the above method (2) as long as the resin can be dissolved, dispersed or swelled therein. Specific examples of the organic solvent include alcohols such as methyl alcohol, ethyl alcohol, and isopropyl alcohol; ketones such as acetone and methyl ethyl ketone; aromatic hydrocarbons such as benzene, toluene, and xylene; hydrocarbon chlorides such as methylene chloride and the like; and amides such as dimethylacrylamide and dimethylformamide; and so on.

Here the content of the near infrared absorptive composition in the resin composition as an optical material differs depending upon the application or intended use of the optical material, and in view of formability, it is normally adjusted in the range of 0.1 to 400 parts by mass, preferably in the range of 0.3 to 200 parts by mass, particularly preferably in the range of 1 to 100 parts by mass, based on 100 parts by mass of the resin. The content of the metal ions in the resin composition is adjusted preferably so as to be 2 to 60% by mass of the entire resin composition.

FOURTH EMBODIMENT

Adhesive Composition

This adhesive composition is one form of the resin composition, in which the near infrared absorptive composition obtained by the reaction between the specific phosphate compound and the metal salt is mixed in a resin with adherence (which will be referred to hereinafter as "adhesive resin"). Such adhesive resin can be, for example, one of acrylic resins with adherence, polyvinyl butyral, ethylene-vinyl acetate copolymers, partly saponified products thereof, and so on.

Further, the adhesive composition may also contain a benzotriazole, benzophenone, or salicylic acid based ultraviolet absorber and another additive such as an antioxidant, a stabilizer, or the like. In addition, the adhesive composition may contain one or more of various plasticizers. Examples of such plasticizers include phosphate based plasticizers such as tricresyl phosphate and triphenyl phosphate; phthalic acid based plasticizers such as dioctyl phthalate and dibutyl phthalate; fatty acid based plasticizers such as dibutyl sebacate, butylricinoleate, methyl acetylricinoleate, and butyl succinate; glycol based plasticizers such as butylphthalyl-butyl glycolate, triethylene glycol dibutylate, triethylene glycol di-2-ethylbutyrate, and polyethylene glycol; and so on.

The optical material of each form described above provides the excellent near infrared absorbing property and the visible light transmitting property higher than before, because it contains the near infrared absorptive composition of the present invention. In addition, the near infrared absorptive composition is given the characteristics and properties specific to the resin used. By properly selecting the resin, it is feasible to readily obtain optical materials suitable for various applications accordingly.

<Optical Members>

By applying the near infrared absorptive composition or the optical material containing it according to the present invention, it is feasible to form optical members suitable for various applications. In the following, the term "optical material" is used as a term including the near infrared absorptive composition. Forms of the optical members include the optical material itself, combination with a transparent material or the like, molded products, etc., specifically, various forms including the powder form, liquid form, adhesive form, paint form, film form, sheet form, cylinder form, lens form, and so on.

Such optical members present excellent optical characteristics, versatility, durability, weather resistance, economical efficiency, etc. and are suitably applicable to formation of various elements, e.g., luminosity correcting members for CCD, for CMOS, or for other light receiving elements, members for photometry, heat absorbing members, compound optical filters, lens members (glasses, sunglasses, goggles, optical systems, optical waveguide systems), fiber members (optical fibers), noise cutting members, display covers or display filters such as plasma display front panels or the like, projector front panels, members for cutting heat from a light source, tone correcting members, luminance adjusting members, optical elements (optical amplifiers, wavelength converting elements, etc.), Faraday elements, functional devices for optical communication such as isolators or the like, elements for optical disks, and so on.

EXAMPLES

Specific examples according to the present invention will be described below, but it should be noted that the present invention is by no means intended to be limited to these examples.

Example 1

0.08 g of copper acetate monohydrate and a predetermined amount of the phosphate compound represented by Formula (7)-b (hereinafter referred to as "DIPHP") were agitated in methyl ethyl ketone (hereinafter referred to as "MEK") for two hours, thereby obtaining a liquid near infrared absorptive composition. The predetermined amount of DIPHP was one of different values in the range of the molar ratio of hydroxyl groups in the phosphate compound to copper ions (hereinafter represented by "OH/Cu") of 1 to 15. As an example, in the case of OH/Cu being 4, the amount of DIPHP added was 0.4067 g.

Example 2

0.04 g of copper acetate monohydrate and a predetermined amount of a mixture of the phosphate compound represented by Formula (8)-a and the phosphate compound represented by Formula (8)-b (hereinafter referred to as "3ClPHP") were agitated in MEK for two hours, thereby obtaining a liquid near infrared absorptive composition. The predetermined amount of 3ClPHP was one of different values in the range of OH/Cu of 1 to 15. As an example, in the case of OH/Cu being 4, the amount of 3ClPHP added was 0.2553 g.

Example 3

0.04 g of copper acetate monohydrate and a predetermined amount of a mixture of the phosphate compound represented by Formula (8)-c and the phosphate compound represented by Formula (8)-d (hereinafter referred to as "4ClPHP") were agitated in MEK for two hours, thereby obtaining a liquid near infrared absorptive composition. The predetermined amount of 4ClPHP was one of different values in the range of OH/Cu of 1 to 10. As an example, in the case of OH/Cu being 4, the amount of 4ClPHP added was 0.2553 g.

Example 4

0.08 g of copper acetate monohydrate and a predetermined amount of a mixture of the phosphate compound represented by Formula (8)-e and the phosphate compound represented by Formula (8)-f (hereinafter referred to as "2FPHP") were agitated in MEK for two hours, thereby obtaining a liquid near infrared absorptive composition. The predetermined amount of 2FPHP was one of different values in the range of OH/Cu of 1 to 10. As an example, in the case of OH/Cu being 4, the amount of 2FPHP added was 0.4067 g.

Example 5

0.04 g of copper acetate monohydrate and a predetermined amount of a mixture of the phosphate compound represented by Formula (8)-g and the phosphate compound represented by Formula (8)-h (hereinafter referred to as "4FPHP") were agitated in MEK for two hours, thereby obtaining a liquid near infrared absorptive composition. The predetermined amount of 4FPHP was one of different values in the range of OH/Cu of 1 to 15. As an example, in the case of OH/Cu being 4, the amount of 4FPHP added was 0.2033 g.

Example 6

0.04 g of copper acetate monohydrate and a predetermined amount of a mixture of the phosphate compound represented by Formula (10)-c and the phosphate compound represented by Formula (10)-d (hereinafter referred to as "NAPHP") were agitated in MEK for two hours, thereby obtaining a liquid near infrared absorptive composition. The predetermined amount of NAPHP was one of different values in the range of OH/Cu of 1.5 to 2.5. As an example, in the case of OH/Cu being 2.5, the amount of NAPHP added was 0.1752 g.

Example 7

0.04 g of copper acetate monohydrate and a predetermined amount of a mixture of the phosphate compound represented by Formula (10)-a and the phosphate compound represented by Formula (10)-b (hereinafter referred to as "2PHPHP") were agitated in MEK for two hours, thereby obtaining a liquid near infrared absorptive composition. The predetermined amount of 2PHPHP was one of different values in the range of OH/Cu of 1 to 15. As an example, in the case of OH/Cu being 4, the amount of 2PHPHP added was 0.3219 g.

Comparative Example 1

0.08 g of copper acetate monohydrate and a predetermined amount of a mixture of the phosphate compound represented by Formula (11)-a below and the phosphate compound represented by Formula (11)-b below (hereinafter referred to as "PMOE") were agitated in MEK for two hours, thereby obtaining a liquid near infrared absorptive composition. The predetermined amount of PMOE was one of different values in the range of OH/Cu of 1 to 15. As an example, in the case of OH/Cu being 4, the amount of PMOE added was 0.2903 g.

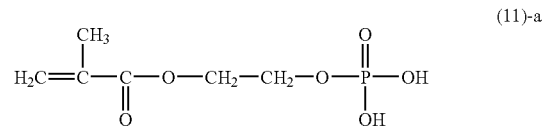

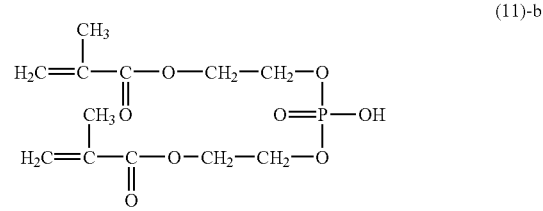

<Spectral Transmittance Measurement 1>

For the near infrared absorptive compositions prepared in Examples 1 to 7 and Comparative Example 1, the spectral absorbance was measured using a spectrophotometer "U-4000" (available from Hitachi, Ltd. (Hitachi Seisakusho)). As an example of the measurement results, FIG. 1 presents absorption spectra of the respective near infrared absorptive compositions in Examples and Comparative Example where OH/Cu is 6. In the drawing, a curve L0, curves L1 to L5, and a curve L7 indicate absorption curves of the near infrared absorptive compositions in Comparative Example 1, in Examples 1 to 5, and in Example 7, respectively. (No curve is shown for Example 6, because no data was gained for OH/Cu of 6).

It was verified from the drawing that the compositions of the examples and comparative example all had the transmitting region (visible light transmission wavelength region) in the wavelength range of about 400 to about 650 nm and the near infrared absorbing property. It is also seen that the wavelength λmax at an absorbance peak falls in the wavelength range of about 800 to 900 nm. It was proved that λmax of the near infrared absorptive compositions in the examples was located on the longer wavelength side than that in the comparative example and that the absorbance in the near infrared region was higher than in the comparative example, thus achieving improvement in the near infrared absorbing property.

Figure 2:
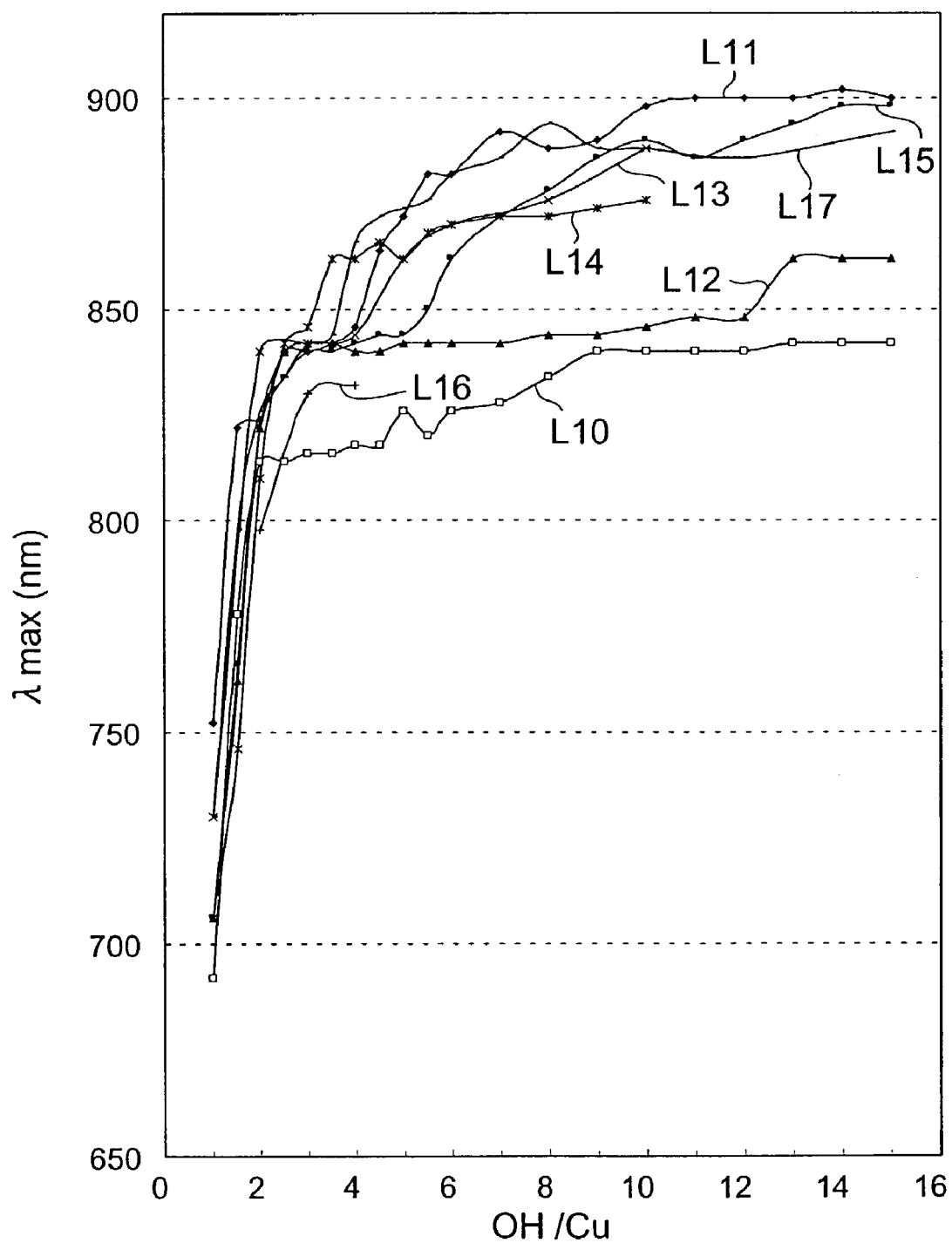
FIG. 2 is a graph showing changes of λmax against OH/Cu in Examples and Comparative Example.

Further, the data was evaluated with focus on the tendency of λmax against OH/Cu. FIG. 2 is a graph showing changes of λmax (nm) in the examples and comparative example against OH/Cu. The numerical data is also presented in Table 1. In the drawing, the wavelengths λmax at respective data sampling points of OH/Cu are plotted with different symbols for the respective examples. Curves L10 and L11 to 17 connecting respective identical symbols are indication lines for the data of Comparative Example 1 and Examples 1 to 7, respectively, which are smoothed lines by smoothing processing. (Indication lines in FIGS. 3 to 6 hereinafter are also smoothed lines.)

TABLE 1

| | | | | λmax nm | | | | |
|---|---|---|---|---|---|---|---|---|
| OH/Cu | Comp Ex. 1 PMOE | Ex. 1 DIPHP | Ex. 2 3ClPHP | Ex. 3 4ClPHP | Ex. 4 2FPHP | Ex. 5 4FPHP | Ex. 6 NAPHP | Ex. 7 2PHPHP |
| 1.0 | 692 | 752 | 706 | 730 | 706 | 706 | — | 730 |
| 1.5 | 778 | 822 | 762 | — | 746 | 766 | 798 | 798 |
| 2.0 | 814 | 824 | 822 | 840 | 810 | 822 | 830 | 826 |
| 2.5 | 814 | 840 | 840 | — | 842 | 834 | 832 | 834 |
| 3.0 | 816 | 840 | 842 | 842 | 846 | 840 | — | 842 |
| 3.5 | 816 | 842 | 842 | — | 862 | 840 | — | 844 |
| 4.0 | 818 | 846 | 840 | 844 | 862 | 842 | — | 866 |
| 4.5 | 818 | 864 | 840 | — | 866 | 844 | — | 872 |
| 5.0 | 826 | 872 | 842 | 862 | 862 | 844 | — | 874 |
| 5.5 | 820 | 882 | 842 | — | 868 | 850 | — | 876 |
| 6.0 | 826 | 882 | 842 | 870 | 870 | 862 | — | 882 |
| 7.0 | 828 | 892 | 842 | — | 872 | 872 | — | 886 |
| 8.0 | 834 | 888 | 844 | 876 | 872 | 878 | — | 894 |
| 9.0 | 840 | 890 | 844 | — | 874 | 886 | — | 888 |
| 10.0 | 840 | 898 | 846 | 888 | 876 | 890 | — | 888 |
| 11.0 | 840 | 900 | 848 | — | — | 886 | — | — |
| 12.0 | 840 | 900 | 848 | — | — | 890 | — | 886 |
| 13.0 | 842 | 900 | 862 | — | — | 894 | — | — |
| 14.0 | 842 | 902 | 862 | — | — | 898 | — | — |
| 15.0 | 842 | 900 | 862 | — | — | 898 | — | 892 |

It is clear from the figure and table that in the wide range of OH/Cu (1 to 15), the examples (curves L11 to L17) present λmax equal to or greater than that in Comparative Example 1 (curve L10). Particularly, it was verified that the shift of λmax to the longer wavelength side became prominent in the range of OH/Cu of not less than about 2.

Figure 3:
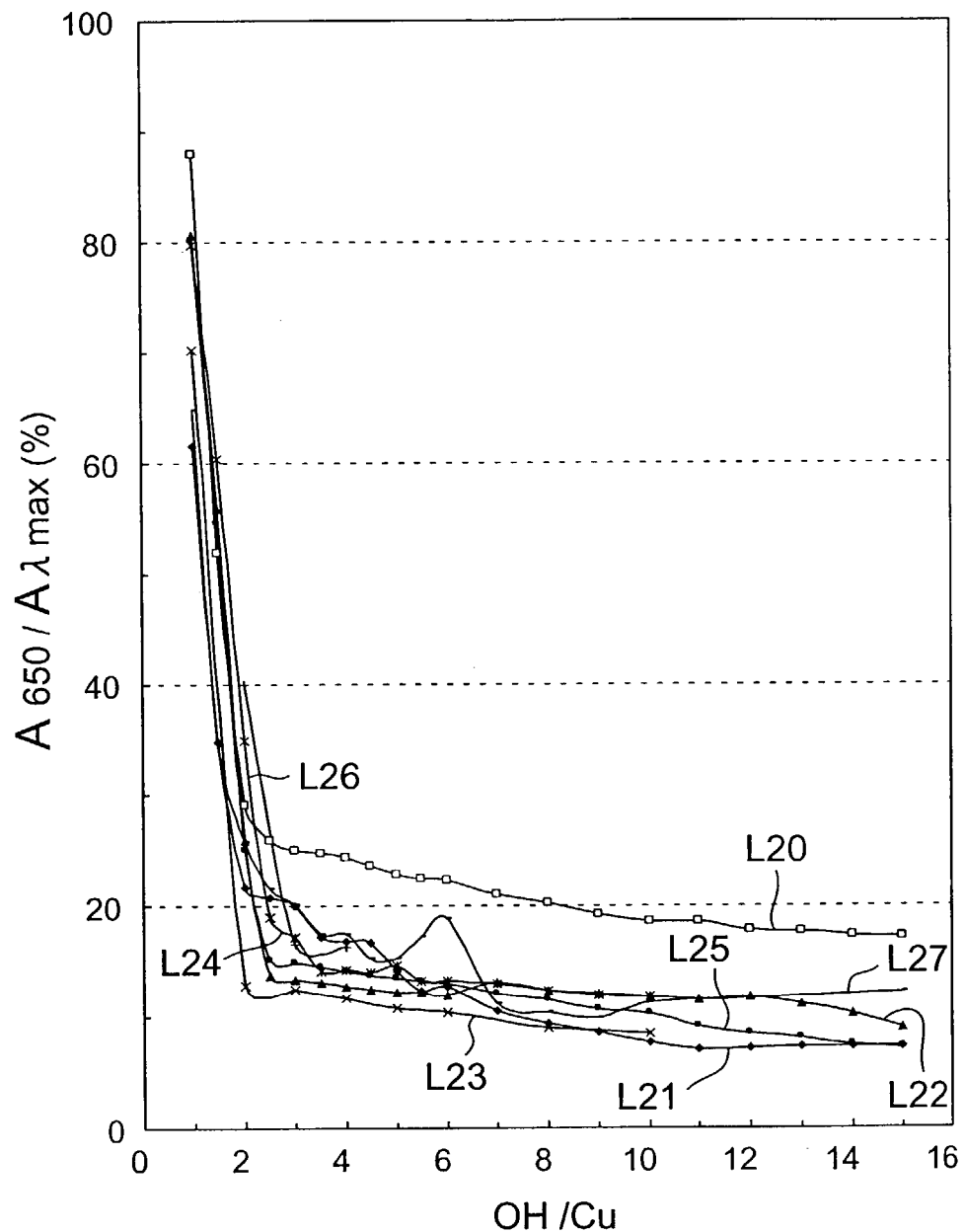
FIG. 3 is a graph showing changes of $A_{650}/A_{\lambda max}$ against OH/Cu in Examples and Comparative Example.
Figure 4:
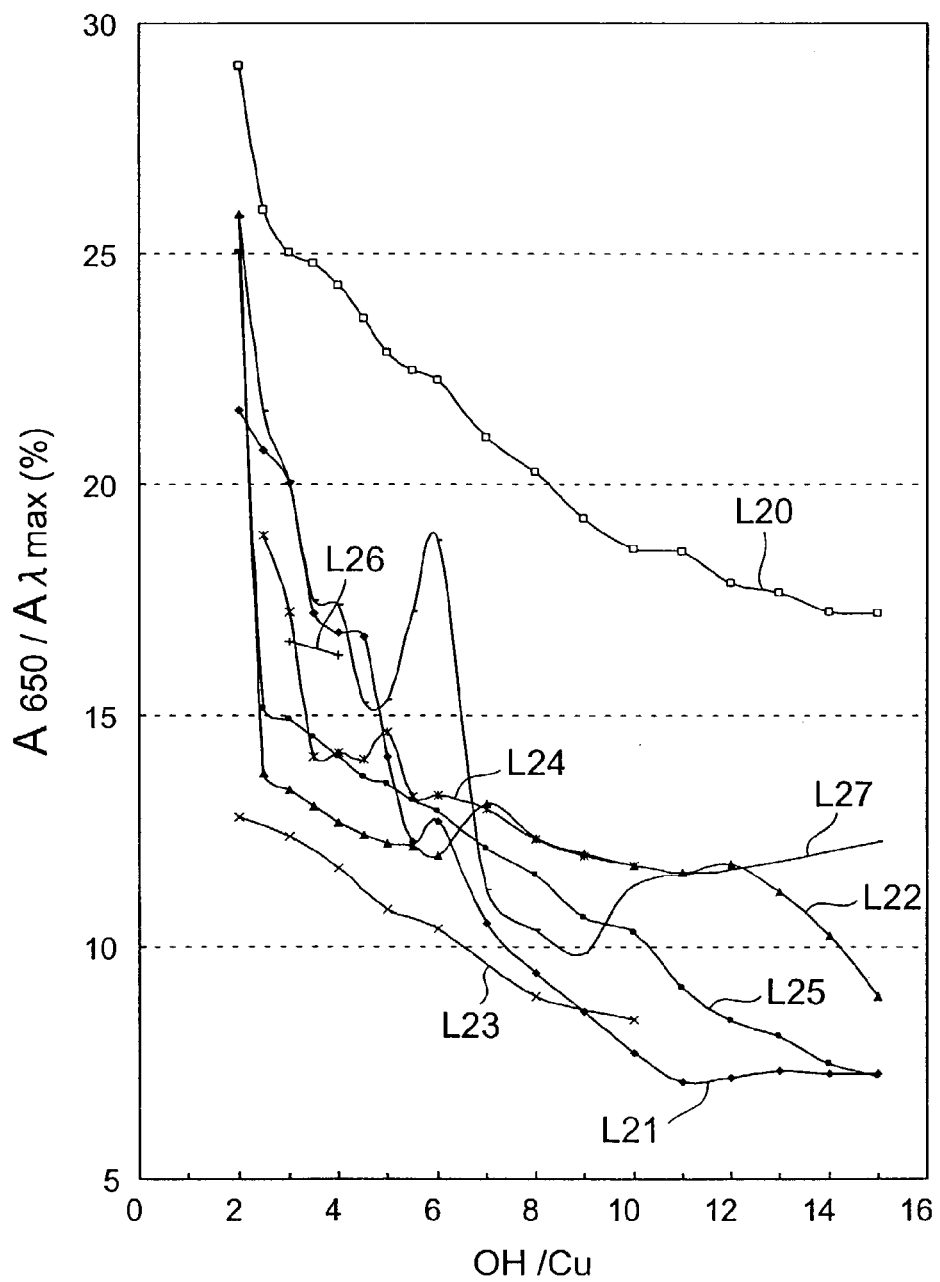
FIG. 4 is an enlargement of the vertical axis in the part corresponding to OH/Cu of 2–16 in FIG. 3.

Next, FIG. 3 is a graph showing changes of the ratio (%) of the absorbance at the wavelength of 650 nm being the long wavelength part of the visible light transmission wavelength region (the wavelengths of about 400 to 650 nm shown in FIG. 1) to the absorbance at λmax in the examples and comparative example (which will be denoted hereinafter and in the drawings and tables by "$A_{650}/A_{\lambda max}$") against OH/Cu. FIG. 4 is an enlargement of the vertical axis in the part corresponding to OH/Cu of 2 to 16 in FIG. 3, excluding the plots of the data at values of the ratio over 30%. Further, the numerical data is presented in Table 2.

The values of the ratio indicate normalized visible light transparency to near infrared absorbability and are considered to be an index for evaluating the specific character of the near infrared absorptive compositions having both the near infrared absorbing property and the visible light transmitting property. As the value of this ratio decreases, the near infrared light is absorbed more while the visible light is transmitted more at the long wavelength part of the visible light transmission wavelength region. Curves L20 and L21 to L27 in the drawings are curves smoothly connecting the data of Comparative Example 1 and Examples 1 to 7, respectively.

TABLE 2

| | | | | A650 Aλmax | | | | |
|---|---|---|---|---|---|---|---|---|
| OH/Cu | Comp Ex. 1 PMOE | Ex. 1 DIPHP | Ex. 2 3ClPHP | Ex. 3 4ClPHP | Ex. 4 2FPHP | Ex. 5 4FPHP | Ex. 6 NAPHP | Ex. 7 2PHPHP |
| 1 | 87.98 | 61.52 | 80.66 | 70.22 | 79.78 | 80.18 | — | 64.87 |
| 1.5 | 51.91 | 34.73 | 55.94 | — | 60.34 | 54.58 | 40.03 | 34.34 |
| 2 | 29.08 | 21.61 | 25.86 | 12.78 | 34.93 | 25.03 | 16.58 | 25.82 |
| 2.5 | 25.95 | 20.76 | 13.75 | — | 18.92 | 15.12 | 16.30 | 21.58 |
| 3 | 25.03 | 20.03 | 13.38 | 12.38 | 17.23 | 14.89 | — | 20.07 |
| 3.5 | 24.80 | 17.22 | 13.03 | — | 14.09 | 14.52 | — | 17.50 |
| 4 | 24.31 | 16.81 | 12.68 | 11.68 | 14.19 | 14.08 | — | 17.40 |
| 4.5 | 23.61 | 16.70 | 12.40 | — | 14.03 | 13.66 | — | 15.25 |
| 5 | 22.86 | 14.11 | 12.22 | 10.80 | 14.64 | 13.50 | — | 15.32 |
| 5.5 | 22.47 | 12.27 | 12.16 | — | 13.23 | 13.14 | — | 17.24 |
| 6 | 22.26 | 12.70 | 11.97 | 10.39 | 13.26 | 12.90 | — | 18.81 |
| 7 | 21.02 | 10.49 | 13.08 | — | 12.96 | 12.10 | — | 11.22 |
| 8 | 20.27 | 9.42 | 12.35 | 8.92 | 12.30 | 11.55 | — | 10.34 |
| 9 | 19.27 | 8.59 | 12.03 | — | 11.95 | 10.62 | — | 9.86 |
| 10 | 18.62 | 7.70 | 11.75 | 8.42 | 11.75 | 10.30 | — | 11.34 |
| 11 | 18.56 | 7.09 | 11.60 | — | — | 9.09 | — | — |
| 12 | 17.88 | 7.16 | 11.78 | — | — | 8.40 | — | 11.66 |
| 13 | 17.67 | 7.32 | 11.18 | — | — | 8.06 | — | — |
| 14 | 17.26 | 7.27 | 10.24 | — | — | 7.47 | — | — |
| 15 | 17.23 | 7.27 | 8.92 | — | — | 7.20 | — | 12.24 |

It was verified from the results that in the entire region of OH/Cu as shown, $A_{650}/A_{\lambda max}$ of the near infrared absorptive compositions in the examples demonstrated generally smaller values than in the comparative example and this tendency became prominent, particularly, in the range of OH/Cu of not less than 2.

Figure 5:
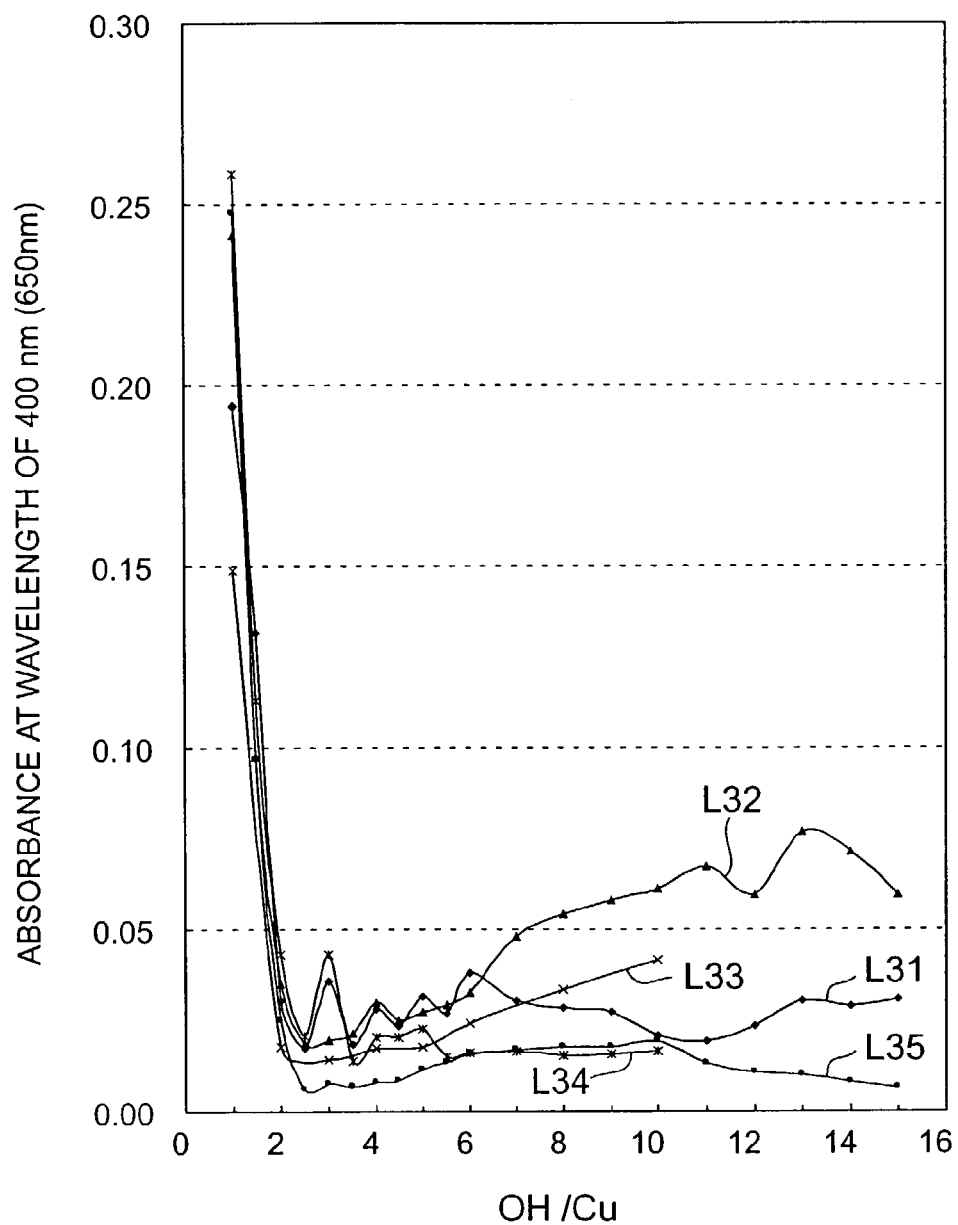
FIG. 5 is a graph showing changes of absorbance at the wavelength of 400 nm against OH/Cu in Examples 1 to 5.

Next, FIG. 5 is a graph showing changes of the absorbance (absolute value) at the wavelength of 400 nm against OH/Cu in Examples 1 to 5. Curves L31 to L35 in the drawing are curves smoothly connecting the data of Examples 1 to 5, respectively. The numerical data is also presented in Table 3. The wavelength of 400 nm is the aforementioned short wavelength part of the visible light transmission wavelength region and the magnitude of absorbance at this wavelength is considered to be an index for evaluating expansion of the visible light transmission wavelength region to the shorter wavelength side.

TABLE 3

Absorbance of wavelength of 400 nm

| OH/Cu | Ex. 1 DIPHP | Ex. 2 3ClPHP | Ex. 3 4ClPHP | Ex. 4 2FPHP | Ex. 5 4FPHP |
|---|---|---|---|---|---|
| 1 | 0.1943 | 0.2415 | 0.1489 | 0.2584 | 0.2478 |
| 1.5 | 0.1316 | 0.0977 | — | 0.1130 | 0.0968 |
| 2 | 0.0302 | 0.0351 | 0.0178 | 0.0430 | 0.0248 |
| 2.5 | 0.0172 | 0.0189 | — | 0.0207 | 0.0062 |
| 3 | 0.0356 | 0.0196 | 0.0144 | 0.0431 | 0.0075 |
| 3.5 | 0.0186 | 0.0215 | — | 0.0137 | 0.0068 |
| 4 | 0.0281 | 0.0299 | 0.0171 | 0.0202 | 0.0081 |
| 4.5 | 0.0234 | 0.0249 | — | 0.0205 | 0.0086 |
| 5 | 0.0314 | 0.0272 | 0.0175 | 0.0227 | 0.0116 |
| 5.5 | 0.0270 | 0.0291 | — | 0.0148 | 0.0134 |
| 6 | 0.0381 | 0.0326 | 0.0243 | 0.0162 | 0.0156 |
| 7 | 0.0304 | 0.0479 | — | 0.0166 | 0.0170 |
| 8 | 0.0286 | 0.0541 | 0.0335 | 0.0152 | 0.0178 |
| 9 | 0.0274 | 0.0579 | — | 0.0159 | 0.0176 |
| 10 | 0.0208 | 0.0612 | 0.0414 | 0.0167 | 0.0192 |
| 11 | 0.0191 | 0.0674 | — | — | 0.0130 |
| 12 | 0.0236 | 0.0596 | — | — | 0.0107 |
| 13 | 0.0304 | 0.0769 | — | — | 0.0100 |
| 14 | 0.0289 | 0.0716 | — | — | 0.0081 |
| 15 | 0.0308 | 0.0597 | — | — | 0.0064 |

It was verified from the figure and table that in the range of OH/Cu of 2 to 9, the near infrared absorptive compositions of Examples 2 to 5 demonstrated the absorbance at the wavelength of 400 nm equal to or smaller than that in Example 1 (while Examples 2 and 3 demonstrated a good tendency in the range of OH/Cu of 2 to 6). The phosphate compounds used in Examples 2 to 5 are those each having a halogen-substituted phenyl group, and the above result can be considered to reflect the effect of halogen substitution.

Figure 6:
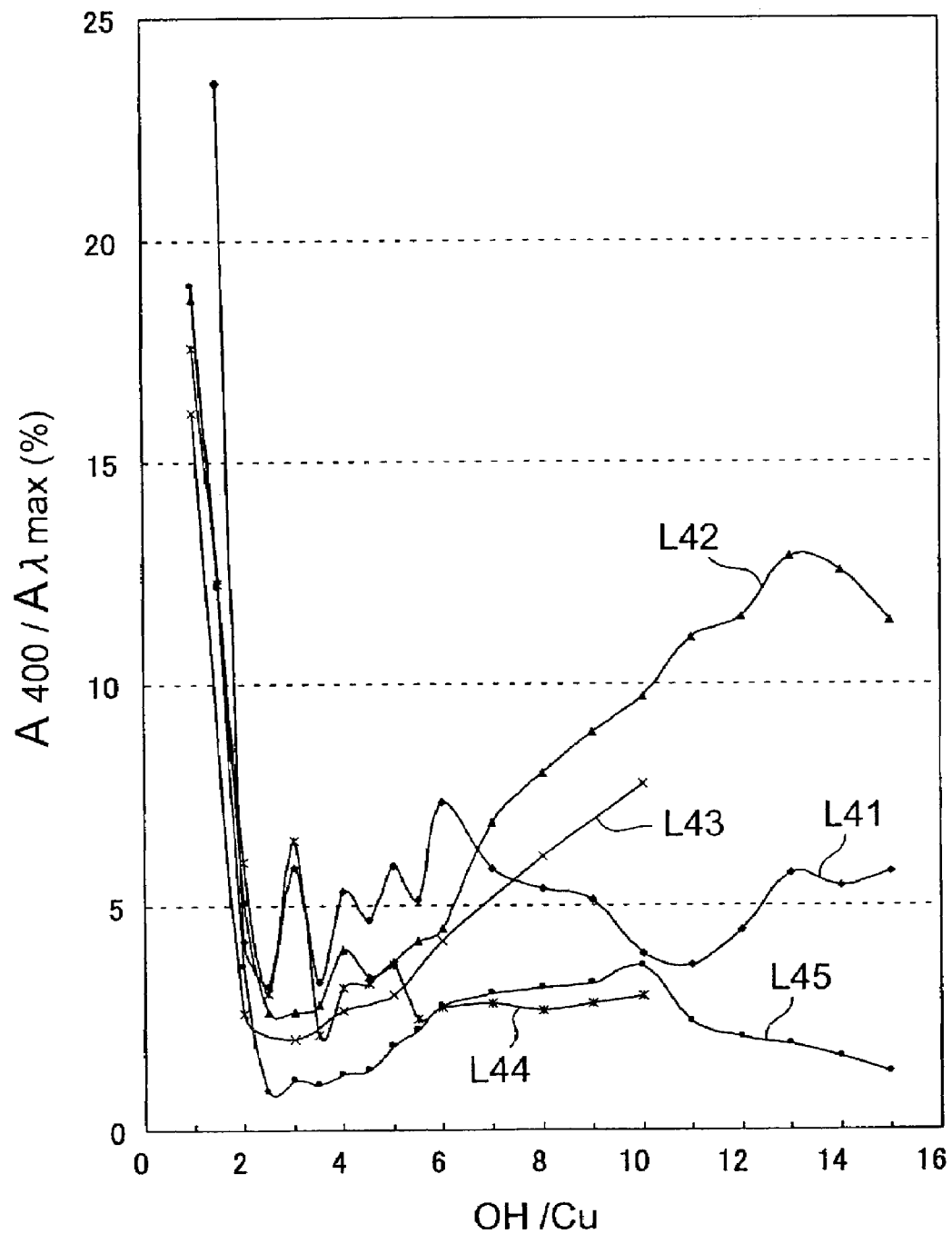
FIG. 6 is a graph showing changes of $A_{400}/A_{\lambda max}$ against OH/Cu in Examples 1 to 5.

FIG. 6 is a graph showing changes of the ratio (%) of the absorbance at the wavelength of 400 nm being the short wavelength part of the visible light transmission wavelength region (the wavelengths of about 400 to 650 nm shown in FIG. 1) to the absorbance at λmax against OH/Cu in Examples 1 to 5 (which will be denoted hereinafter and in the drawing and table by "$A_{400}/A_{\lambda max}$") Further, the numerical data is also presented in Table 4.

TABLE 4

A400 Aλmax

| OH/Cu | Ex. 1 DIPHP | Ex. 2 3ClPHP | Ex. 3 4ClPHP | Ex. 4 2FPHP | Ex. 5 4FPHP |
|---|---|---|---|---|---|
| 1 | 28.97 | 18.68 | 16.10 | 17.58 | 18.97 |
| 1.5 | 23.53 | 12.36 | — | 12.27 | 12.17 |

TABLE 4-continued

A400 Aλmax

| OH/Cu | Ex. 1 DIPHP | Ex. 2 3ClPHP | Ex. 3 4ClPHP | Ex. 4 2FPHP | Ex. 5 4FPHP |
|---|---|---|---|---|---|
| 2 | 4.22 | 5.13 | 2.60 | 6.00 | 3.64 |
| 2.5 | 3.21 | 2.65 | — | 3.04 | 0.86 |
| 3 | 5.86 | 2.63 | 2.02 | 6.47 | 1.11 |
| 3.5 | 3.29 | 2.80 | — | 2.13 | 1.03 |
| 4 | 5.33 | 4.02 | 2.68 | 3.16 | 1.23 |
| 4.5 | 4.71 | 3.43 | — | 3.26 | 1.35 |
| 5 | 5.91 | 3.75 | 3.02 | 3.69 | 1.87 |
| 5.5 | 5.15 | 4.21 | — | 2.47 | 2.23 |
| 6 | 7.34 | 4.52 | 4.23 | 2.74 | 2.74 |
| 7 | 5.85 | 6.89 | — | 2.84 | 3.06 |
| 8 | 5.40 | 8.00 | 6.11 | 2.66 | 3.19 |
| 9 | 5.15 | 8.90 | — | 2.81 | 3.27 |
| 10 | 3.93 | 9.72 | 7.75 | 3.00 | 3.65 |
| 11 | 3.68 | 11.03 | — | — | 2.42 |
| 12 | 4.48 | 11.51 | — | — | 2.06 |
| 13 | 5.74 | 12.89 | — | — | 1.91 |
| 14 | 5.46 | 12.55 | — | — | 1.61 |
| 15 | 5.77 | 11.42 | — | — | 1.26 |

Values of this ratio indicate normalized visible light transparency to the near infrared absorbability and are considered to be an index for evaluating the specific character of the near infrared absorptive compositions having both the near infrared absorbing property and the visible light transmitting property. As the value of this ratio decreases, the near infrared light is absorbed more and the visible light is transmitted more at the short wavelength part of the visible light transmission wavelength region. Curves L41 to L45 in the drawing are curves smoothly connecting the data of Examples 1 to 5, respectively. It was verified from the results that $A_{400}/A_{\lambda max}$ in Examples 1 to 5 also demonstrated the tendency similar to that shown in FIG. 5.

Figure 7:
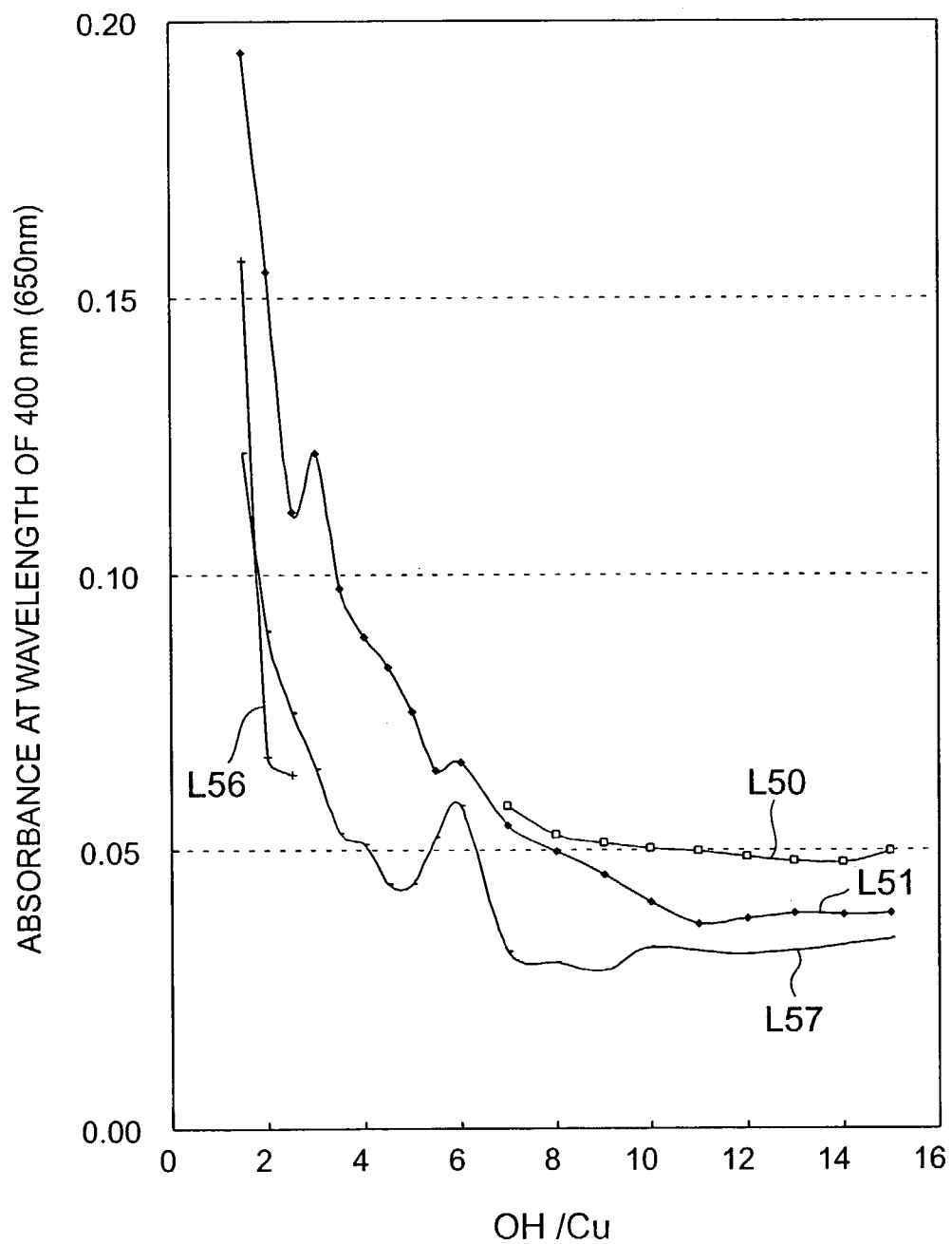
FIG. 7 is a graph showing changes of absorbance at the wavelength of 650 nm against OH/Cu in Comparative Example 1, and Examples 1, 6, and 7.

Further, FIG. 7 is a graph showing changes of the absorbance (absolute value) at the wavelength of 650 nm against OH/Cu in Comparative Example 1 and in Examples 1, 6, and 7. Curves L50, L51, L56, and L57 in the drawing are curves smoothly connecting the data of Comparative Example 1 and Examples 1, 6, and 7, respectively. The numerical data is also presented in Table 5. The wavelength of 650 nm is the aforementioned long wavelength part of the visible light transmission wavelength region and the magnitude of the absorbance at this wavelength can be considered to be an index for evaluating expansion of the visible light transmission wavelength region to the longer wavelength side.

TABLE 5

Absorbance at wavelength of 650 nm

| OH/Cu | Comp. Ex.1 PMOE | Ex.1 DIPHP | Ex.6 NAPHP | Ex.7 2PHPHP |
|---|---|---|---|---|
| 1.5 | — | 0.1943 | 0.1566 | 0.1218 |
| 2 | — | 0.1546 | 0.0669 | 0.0896 |
| 2.5 | — | 0.1113 | 0.0636 | 0.0747 |
| 3 | — | 0.1218 | — | 0.0647 |
| 3.5 | — | 0.0973 | — | 0.0531 |
| 4 | — | 0.0886 | — | 0.0511 |
| 4.5 | — | 0.0830 | — | 0.0438 |
| 5 | — | 0.0749 | — | 0.0438 |
| 5.5 | — | 0.0643 | — | 0.0522 |
| 6 | — | 0.0659 | — | 0.0580 |
| 7 | 0.0579 | 0.0545 | — | 0.0319 |
| 8 | 0.0528 | 0.0499 | — | 0.0298 |
| 9 | 0.0512 | 0.0457 | — | 0.0284 |

TABLE 5-continued

| | Absorbance at wavelength of 650 nm | | | |
|---|---|---|---|---|
| OH/Cu | Comp. Ex.1 PMOE | Ex.1 DIPHP | Ex.6 NAPHP | Ex.7 2PHPHP |
| 10 | 0.0503 | 0.0407 | — | 0.0326 |
| 11 | 0.0497 | 0.0368 | — | — |
| 12 | 0.0488 | 0.0377 | — | 0.0314 |
| 13 | 0.0481 | 0.0388 | — | — |
| 14 | 0.0479 | 0.0385 | — | — |
| 15 | 0.0498 | 0.0388 | — | 0.0341 |

It was verified from the drawing and table that he entire region of OH/Cu illustrated, the near infrared absorptive composition of Example 7 demonstrated the absorbance at the wavelength of 650 nm smaller than that in Example 1. The phosphate compounds used in Example 7 are those each having a phenyl-substituted phenyl group, and the above result can be considered to reflect the effect of phenyl substitution.

It was also shown that in the range of OH/Cu of 1.5 to 2.5, the composition in Example 6 demonstrated the absorbance at the wavelength of 650 nm smaller than that in Example 1. In view of this result together with the steric hindrance effect in the molecular structure, it is inferred that the absorbance at the wavelength of 650 nm can be decreased more in the wide range of OH/Cu by using the phosphate compounds having a naphthyl group as in Example 6. It was verified that in the range of OH/Cu of not less than 7, the near infrared absorptive compositions of Examples 1, 6, and 7 demonstrated the absorbance smaller than that in Comparative Example 1.

Example 8

The phosphate compounds represented by aforementioned Formula (10)-e and Formula (10)-f (hereinafter referred to as "PP2MP") were synthesized according to the following procedure. First, 40 g of 4-(2-hydroxyethyl)phenol (compound 1) represented by Formula (12) below;

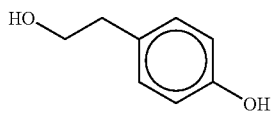

(12)

and 64.46 g of triethylamine were put into a receptacle containing 300 ml of methylene chloride, and the solution was stirred at room temperature for ten minutes.

This solution was cooled to 0° C. and methacryloyl chloride (90 g) was dropped in 30 minutes, using a dropping funnel. Thereafter, the solution was retained in this state for one hour to bring about reaction between the compound 1 represented by above Formula (12) and methacryloyl chloride, thereby obtaining a solution containing a compound (compound 2) represented by Formula (13) below;

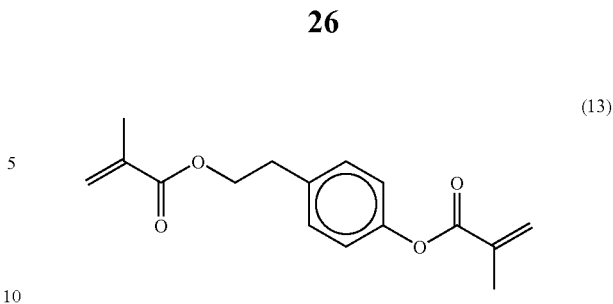

(13)

Then this solution was filtered and ethyl acetate was added into a filtrate. This filtrate was distilled under reduced pressure to remove only methylene chloride. Further, water was added into this filtrate to extract the compound represented by Formula (13), with ethyl acetate. This extract solution was washed with 1% hydrochloric acid and a saturated sodium chloride solution and thereafter anhydrous sodium sulfate was added thereinto to remove water. This solution was concentrated under reduced pressure and thereafter this concentrated solution was refined by column chromatography using a carrier solution prepared at the volume ratio of ethyl acetate and n-hexane of 1:3, thereby obtaining the compound 2. The refined compound 2 weighed 78.8 g and the yield thereof was 92.2%.

Then the compound 2 (20.17 g) was put into 80 ml of water and 320 ml of methanol and the mixture was stirred at room temperature for twenty minutes. Then sodium hydrogencarbonate was further added and the mixture was stirred at room temperature for ten minutes. Thereafter, this solution was heated to 70° C. and the compound 2 and sodium hydrogencarbonate were allowed to react for nine hours, thereby obtaining a compound 3 represented by Formula (14) below;

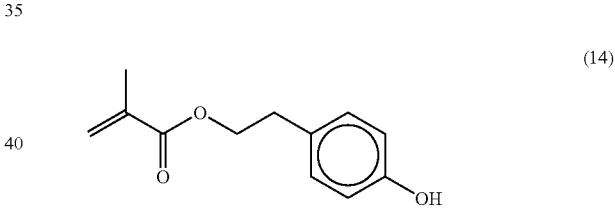

(14)

This solution was cooled and thereafter 1% hydrochloric acid was added thereinto. Then the compound 3 was extracted with ethyl acetate. Then this organic layer was washed with saturated sodium chloride and thereafter anhydrous sodium sulfate was added thereinto. Then the organic layer was further concentrated under reduced pressure and thereafter this concentrated solution was refined by column chromatography using a carrier solution prepared at the volume ratio of ethyl acetate and n-hexane of 1:3, thereby obtaining white powder. The resultant white powder was washed with petroleum ether and filtered. This white powder was dried under reduced pressure to obtain the compound 3. The refined compound 3 weighed 11.61 g and the yield thereof was 76.6%.

Then the compound 3 (45.39 g) was added into 17.42 g of pyridine and 90 ml of toluene and this solution was stirred at room temperature to dissolve the compound. On the other hand, 16.88 g of phosphorus oxychloride and 45 ml of toluene were mixed and stirred at room temperature for ten minutes. Using a dropping funnel, the solution containing the compound 3, prepared previously, was dropped and mixed into the foregoing solution in one hour. Thereafter, this mixed solution was refluxed for six and half hours.

Further, this mixed solution was cooled and thereafter 900 ml of water was added thereinto. Thereafter, the solution was heated at 85° C. for five hours to bring about reaction between the compound 3 and phosphorus oxychloride, obtaining 39.91 g of the phosphate compounds represented by Formula (10)-e and Formula (10)-f (hereinafter referred to as "PP2MP").

Then 0.8 g of copper benzoate and a predetermined amount of PP2MP obtained above were stirred in MEK for two hours to obtain a liquid near infrared absorptive composition. The predetermined amount of PP2 MP was one of different values varied so as to achieve OH/Cu of 2, 3, 4, or 5. As an example, for OH/Cu of 2, the amount of PP2 MP added was 2.48 g.

<Spectral Transmittance Measurement 2>

For the near infrared absorptive composition prepared in Example 8, the spectral absorbance measurement was conducted in much the same manner as in aforementioned <Spectral transmittance measurement 1>. It was verified from the result that the composition had the transmittance region (visible light transmittance wavelength region) in the wavelength range of about 400 to about 650 nm and also had the near infrared absorbing property. It was also verified that the wavelength λmax at the peak of absorbance was in the wavelength range of about 800 to 900 nm.

Example 9

(1) Preparation of monomer: a predetermined amount of PP2MP prepared in Example 8 was dissolved and mixed in 6.6 g of methyl methacrylate (MMA), then 0.5 g of α-methylstyrene was added thereinto, 0.8 g of copper benzoate was further added, and the solution was stirred at room temperature for 48 hours, obtaining a monomer solution as a near infrared absorptive composition. At this time, the solubility of copper benzoate was satisfactorily high at room temperature. The predetermined amount of PP2MP was one of different values varied so as to achieve OH/Cu of 2, 3, 4, or 5. Then, in order to remove benzoic acid from this monomer solution, the solution was refrigerated in a freezer for a predetermined time, and no precipitate was recognized after the storage.

(2) Assembly of glass mold for polymerization: two glass mold disks having the diameter of 81 mm were prepared. A ring packing of plasticized polyvinyl chloride was placed on the periphery of one glass mold disk and the other glass mold disk was mounted thereon in facing arrangement. Then the two glass mold disks were clamped from the outside with clamps to be held, thereby assembling a glass mold (die) for polymerization.

(3) Molding of resin sheet: 0.5 g of t-butyl peroxydecanate was added into each of the monomer solutions with different OH/Cu ratios prepared in above (1), each solution was filtered with a membrane filter, and thereafter these filtrates were charged into respective polymerization glass molds assembled as described in (2) above. Then these were set each in an oven, and polymerization and solidification was effected while controlling temperatures in the following order: the fixed temperature of 40° C. for three hours, increasing temperatures from 40° C. to 100° C. for two hours, the fixed temperature of 100° C. for two hours, and decreasing temperatures from 100° C. to 70° C. for two hours. After completion of the polymerization, the polymerization glass molds were taken out of the oven, and the clamps and glass mold disks were removed, thereby obtaining blue transparent resin sheets with the thickness of 2 mm as optical materials of the present invention. Table 6 presents the recipes of the respective sheets.

Comparative Example 2

The preparation of monomer solution and the molding of resin sheet were conducted in much the same manner as in Example 9, except that PMOE also used in Comparative Example 1 was used instead of PP2MP. The recipes are also presented in Table 6. In the preparation of monomer solution, the solubility of copper benzoate was generally good at room temperature, but part of solutions were stirred to dissolve it in an oil bath, in order to promote dissolution. After the storage in the freezer for removal of benzoic acid, precipitates were recognized. The precipitates were removed by filtration.

TABLE 6

| Recipes | Example 9 | | | | Comparative Example 2 | | | |
| --- | --- | --- | --- | --- | --- | --- | --- | --- |
| | 2 | 3 | 4 | 5 | 2 | 3 | 4 | 5 |
| Phosphate compounds | PP2MP | | | | PMOE | | | |
| Phosphate compounds (g) | 2.48 | 3.72 | 4.96 | 6.2 | 0.95 | 1.42 | 1.9 | 2.38 |
| Copper benzoate (g) | 0.8 | 0.8 | 0.8 | 0.8 | 0.8 | 0.8 | 0.8 | 0.8 |
| g | 6.6 | 6.6 | 6.6 | 6.6 | 6.6 | 6.6 | 6.6 | 6.6 |
| λmax before dipped in methanol (nm) | 766 | 810 | 824 | 840 | 810 | 822 | 828 | 842 |
| λmax after dipped in methanol (nm) | 788 | 844 | 842 | 844 | 820 | 832 | 840 | 842 |
| λT50 before dipped in methanol (nm) | 560 | 602 | 614 | 622 | 608 | 632 | 644 | 656 |
| λT50 after dipped in methanol (nm) | 586 | 664 | 664 | 670 | 618 | 642 | 654 | 662 |

<Spectral Transmittance Measurement 3>

For each of the resin sheets obtained in Example 9 and Comparative Example 2, the spectral transmittance measurement and spectral absorbance measurement was carried out using the spectrophotometer "U-4000" (available from Hitachi, Ltd.). It was verified from the results that the resin sheets had the transmittance region (visible light transmittance wavelength region) in the wavelength range of about 400 to about 650 nm and also had the near infrared absorbing property. Table 6 also presents the wavelength at the peak of absorbance (wavelength at a bottom of transmittance) λmax and the near-infrared-side wavelength at the transmittance of 50%, λT50%, for each of those resin sheets.

Then each of these resin sheets was dipped in methanol for five days and thereafter dried. For each of the resin sheets, the spectral transmittance measurement and spectral absorbance measurement was carried out in much the same manner as above. It was verified from the results of the measurement that with each of the resin sheets obtained in Example 9, the wavelengths λmax and λT50% both were shifted to the longer wavelength side and, particularly, the resin sheets with OH/Cu of 3 to 5 had these wavelengths greater than those of the resin sheets with the same OH/Cu obtained in Comparative Example 2.

This proved that the visible light transmission wavelength region of the resin sheets of Example 9 was expanded by the dipping in methanol solution. The details of the mechanism of this action were not fully clarified yet, but it is presumed that the dipping in ethanol effectively removes the components of benzoic acid and others remaining in small amount in the resin sheets therefrom. It is, however, noted that the action is not limited to this presumption.

As described above, the present invention has permitted the achievement of the near infrared absorptive composition and optical material with the excellent near infrared absorbing property and the higher visible light transmitting property than before through the use of the specific phosphate compounds and copper ions.

The invention claimed is:

1. A near infrared absorptive composition comprising a phosphate compound represented by Formula (1) below;

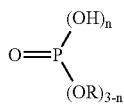

(1)

where R indicates an aryl group at least one hydrogen atom of which is replaced by a halogen atom or a group having an aromatic ring, n is 1 or 2, and, in the case of n being 1, R's may be identical or different aryl groups; and copper ions;

wherein said group having the aromatic ring is a phenyl group at least one hydrogen atom of which is replaced by a halogen atom, a C1–C10 alkyl group, or a C2–C20 group having at least one unsaturated bond.

2. A near infrared absorptive composition comprising a phosphate compound represented by Formula (1) below;

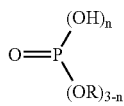

(1)

where R indicates a substituted or unsubstituted naphthyl group or a substituted or unsubstituted anthryl group, n is 1 or 2, and, in the case of n being 1, R's may be identical or different groups; and copper ions.

3. A near infrared absorptive composition comprising a phosphate compound, said phosphate compound being represented by Formula (1) below;

(1)

where R is an aryl group at least one hydrogen atom of which is replaced by a substituted or unsubstituted methacryloyl oxyalkyl group; and copper ions.

4. The near infrared absorptive composition according to claim 3, wherein said phosphate compound is one in which R in said Formula (1) is represented by formula (2)-a below:

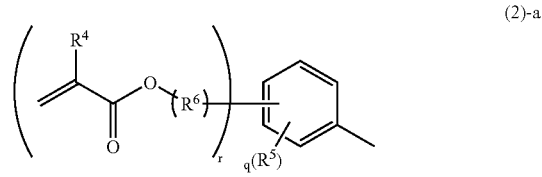

(2)-a where $R^4$ indicates a hydrogen atom or a methyl group, $R^5$ a hydrogen atom, a C1–C10 alkyl group, a halogen atom, an alkoxy group, or a phenyl group, $R^6$ a C1–C10 linear, branched, or cyclic alkylene group, q an integer of 0–4, r an integer of 1–5, and q+r and integer of 1–5.

5. The near infrared absorptive composition according to one of claims 1 to 4, wherein a content of hydroxyl groups in said phosphate compound or oxygen atoms derived from the hydroxyl groups relative to 1 mole of said copper ions is 2 or more moles.

6. An optical material wherein the near infrared absorptive composition as set forth in one of claims 1 to 4, is mixed in a resin.

7. The near infrared absorptive composition according to one of claims 1 to 4, wherein said group having the aromatic ring is a phenyl group at least one hydrogen atom of which is replaced by a halogen atom, a C1–C10 alkyl group, or a C2–C20 group having at least one unsaturated bond.

* * * * *